US008046798B1

(12) United States Patent
Schlack et al.

(10) Patent No.: US 8,046,798 B1
(45) Date of Patent: Oct. 25, 2011

(54) PROFILING AND IDENTIFICATION OF TELEVISION VIEWERS

(75) Inventors: John A. Schlack, Quakertown, PA (US); Andrew Sutton, Norristown, PA (US); Andrew J. Rampulla, Harleysville, PA (US); Charles A Eldering, Furlong, PA (US)

(73) Assignee: Prime Research Alliance E, Inc. (VG)

( * ) Notice: Subject to any disclaimer, the term of this patent is extended or adjusted under 35 U.S.C. 154(b) by 615 days.

(21) Appl. No.: 11/751,154

(22) Filed: May 21, 2007

Related U.S. Application Data

(62) Division of application No. 09/998,979, filed on Oct. 31, 2001, now Pat. No. 7,260,823.

(60) Provisional application No. 60/260,946, filed on Jan. 11, 2001, provisional application No. 60/263,095, filed on Jan. 19, 2001.

(51) Int. Cl.
*G06F 3/00* (2006.01)
*G06F 13/00* (2006.01)
*H04N 5/445* (2011.01)

(52) U.S. Cl. ............... 725/46; 725/9; 725/10; 725/14

(58) Field of Classification Search ............ 725/9, 10, 725/14, 46
See application file for complete search history.

(56) References Cited

U.S. PATENT DOCUMENTS

| | | | |
|---|---|---|---|
| 4,258,386 A | 3/1981 | Cheung | |
| 4,546,382 A | 10/1985 | McKenna | |
| 4,602,279 A | 7/1986 | Freeman | |
| 4,745,549 A | 5/1988 | Hashimoto | |
| 5,251,324 A | 10/1993 | McMullan, Jr. | |
| 5,374,951 A | 12/1994 | Welsh | |
| 5,550,928 A | 8/1996 | Lu | |
| 5,600,364 A | 2/1997 | Hendricks | |
| 5,608,445 A | 3/1997 | Mischler | |
| 5,848,396 A | 12/1998 | Gerace | |
| 5,857,190 A | 1/1999 | Brown | |
| 5,948,061 A | 9/1999 | Merriman | |
| 5,991,735 A | 11/1999 | Gerace | |
| 6,005,597 A | 12/1999 | Barrett | |
| 6,067,440 A | 5/2000 | Diefes | |
| 6,119,098 A | 9/2000 | Guyot | |
| 6,177,931 B1 | 1/2001 | Alexander | |
| 6,236,978 B1 | 5/2001 | Tuzhilin | |
| 6,286,140 B1 | 9/2001 | Ivanyi | |
| 6,446,261 B1 | 9/2002 | Rosser | |
| 6,449,632 B1 | 9/2002 | David | |

(Continued)

FOREIGN PATENT DOCUMENTS

WO WO9741673 11/1997

(Continued)

*Primary Examiner* — Pankaj Kumar
*Assistant Examiner* — Charles N Hicks
(74) *Attorney, Agent, or Firm* — Carlineo, Spicer & Kee, LLC

(57) ABSTRACT

Profiling a television viewer by monitoring and processing, locally at a television viewing environment, the viewer's interactivity (e.g., via a remote control unit) with the television viewing environment. Generating one or more profiles for each viewer based on one or more of the multitude of interactions of each viewer and on, in general, the viewing habits and preferences of the viewer. Automatically and reliably, detecting or inferring at a particular time, which specific individual or individuals, are actually interacting with the TV in household comprising more than one individual. Such viewer identification and profile generation can be used to facilitate the delivery of targeted content, including targeted advertising.

18 Claims, 38 Drawing Sheets

U.S. PATENT DOCUMENTS

| | | |
|---|---|---|
| 6,457,010 B1 | 9/2002 | Eldering |
| 6,463,585 B1 | 10/2002 | Hendricks |
| 6,684,194 B1 * | 1/2004 | Eldering et al. ............... 725/10 |
| 6,684,197 B1 | 1/2004 | Kolls |
| 6,714,917 B1 | 3/2004 | Eldering |
| 2002/0095676 A1 | 7/2002 | Knee |
| 2003/0101449 A1 * | 5/2003 | Bentolila et al. ............... 725/10 |
| 2006/0195857 A1 * | 8/2006 | Wheeler et al. ............... 725/15 |
| 2006/0248558 A1 * | 11/2006 | Barton et al. ................... 725/46 |

FOREIGN PATENT DOCUMENTS

| | | |
|---|---|---|
| WO | WO9828906 | 7/1998 |
| WO | WO9960789 | 11/1999 |
| WO | WO0022818 | 4/2000 |
| WO | WO0033224 | 6/2000 |
| WO | WO0033233 | 6/2000 |
| WO | WO0049801 | 8/2000 |
| WO | WO0054504 | 9/2000 |

* cited by examiner

| | 300 | 302 | 304 | 306 | 308 |
|---|---|---|---|---|---|
| 310 → | NAME | TYPE | SIZE | FLAGS | DESCRIPTION |
| | UPCI | INT | 2 | R | USER PERCEIVED CHANNEL INDICATOR |
| 312 → | BPID | INT | 2 | R | BROADCAST PROGRAM ID |

*FIG. 3A*     CHANNEL MAP TABLE FORMAT

| | | | | | |
|---|---|---|---|---|---|
| 310 → UPCI | 02 | 03 | 04 | 05 | 06 |
| 312 → BPID | 27 | 61 | 13 | 47 | 99 |

*FIG. 3B*     CHANNEL MAP TABLE

|  | NAME | TYPE | SIZE | FLAGS | DESCRIPTION |
|---|---|---|---|---|---|
| 410 | NET_ID | LONG INT | 4 | UR | UNIQUE RECORD ID |
| 412 | NET_NAME | STRING | 40 | R | LONG NETWORK NAME |
| 414 | NET_CALL | STRING | 12 | R | SHORT NETWORK NAME THAT APPEARS ON REPORTS |
| 416 | NET_REF | LONG INT | 4 | U | CHANNEL REFERENCE NUMBER. IF THE VALUE IS SPECIFIED, IT MUST BE UNIQUE. |

*FIG. 4A*  NETWORK TABLE FORMAT

| 410 | NET_ID | 0001 | 0002 |
|---|---|---|---|
| 412 | NET_NAME | WHYY FOX 45 PHILADELPHIA | WKYW NBC 3 PHILADELPHIA |
| 414 | NET_CALL | FOX 45 | NBC 3 |
| 416 | NET_REF |  | 0123 |

*FIG. 4B*  NETWORK TABLE

| | 500 | 502 | 504 | 506 | 508 |
|---|---|---|---|---|---|
| | NAME | TYPE | SIZE | FLAGS | DESCRIPTION |
| 510 | BID_ID | LONG INT | 4 | UR | UNIQUE RECORD ID |
| 512 | BID_BPID | SHORT INT | 2 | R | BROADCAST PROGRAMMING ID |
| 514 | BID_BDMNUM | LONG INT | 4 | R | FOREIGN KEY-BROADCAST DOMAIN NUMBER |
| 516 | BID_NETID | LONG INT | 4 | R | FOREIGN KEY-NETWORK RECORD ID |

*FIG. 5A*

| | | | | |
|---|---|---|---|---|
| 510 | BID_ID | 0001 | 0002 | 0003 | 0004 |
| 512 | BID_BPID | 27 | 61 | 13 | 47 |
| 514 | BID_BDMNUM | 0001 | 0001 | 0001 | 0002 |
| 516 | BID_NETID | 0123 | 0403 | 0002 | 7312 |

*FIG. 5B*

| | 600 | 602 | 604 | 606 | 608 |
|---|---|---|---|---|---|
| | NAME | TYPE | SIZE | FLAGS | DESCRIPTION |
| 610 | PRG_ID | LONG INT | 4 | UR | UNIQUE RECORD ID |
| 612 | PRG_START | LONG INT | 4 | R | START DATE/TIME OF THE PROGRAM AS THE NUMBER OF SECONDS SINCE 1/1/1970 |
| 614 | PRG_END | LONG INT | 4 | R | END DATE/TIME OF THE PROGRAM AS THE NUMBER OF SECONDS SINCE 1/1 /1970 |
| 616 | PRG_NETID | LONG INT | 4 | R | FROEIGN KEY - RECORD ID FROM NETWORK TABLE |
| 618 | PRG_TITLE | STRING | 40 | - | PROGRAM TITLE |

*FIG. 6A* PROGRAM TABLE FORMAT

| | | | | |
|---|---|---|---|---|
| 610 | PRG_ID | 0423 | 0424 | 0425 |
| 612 | PRG_START | 8732 | 4214 | 9176 |
| 614 | PRG_END | 8999 | 4714 | 9476 |
| 616 | PRG_NETID | 0001 | 0002 | 0001 |
| 618 | PRG_TITLE | THE SIMPSONS | LAW & ORDER | X-FILES |

*FIG. 6B* (CORRECTED)

|  | 700 | 702 | 704 | 706 | 708 |
|---|---|---|---|---|---|
|  | NAME | TYPE | SIZE | FLAGS | DESCRIPTION |
| 710 | VERSION | INT | 2 | R | CHANNEL MAP VERSION NUMBER |
| 712 | COUNT | INT | 2 | R | NUMBER OF RECORDS IN THE CHANNEL MAP |
| 714 | SIZE | INT | 2 | R | RECORD SIZE IN BYTES |

*FIG. 7A*

|  | 720 | 722 | 724 | 726 | 728 |
|---|---|---|---|---|---|
|  | NAME | TYPE | SIZE | FLAGS | DESCRIPTION |
| 730 | UPCI | INT | 2 | R | USER PERCEIVED CHANNEL INDICATOR |
| 732 | BPID | INT | 2 | R | BROADCAST PROGRAM ID |
| 734 | NETCALL | CHAR | 12 | R | NETWORK CALL SIGN |
| 736 | NETREF | LONG INT | 4 | R | NETWORK REFERENCE NUMBER |
| 738 | NETIDX | LONG INT | 4 | R | INDEX OF THE NETWORK IN THE PROGRAM TABLE |

*FIG. 7B*

|   | NAME 900 | TYPE 902 | SIZE 904 | FLAGS 906 | DESCRIPTION 908 |
|---|---|---|---|---|---|
| 910 | VERSION | INT | 2 | R | PROGRAM TABLE VERSION NUMBER. |
| 912 | SLOTSIZE | INT | 2 | R | NUMBER OF MINUTES PER SLOT. |
| 914 | SLOTCOUNT | INT | 2 | R | NUMBER OF SLOTS. |
| 916 | STARTDATE | LONG INT | 4 | R | STARTING DATE/TIME OF PROGRAM TABLE. |
| 918 | NETCOUNT | INT | 2 | R | NUMBER OF NETWORKS PER SLOT. |

*FIG. 9A*

|   | NAME 920 | TYPE 922 | SIZE 924 | FLAGS 926 | DESCRIPTION 928 |
|---|---|---|---|---|---|
| 930 | NETREF | LONG INT | 4 | R | NETWORK REFERENCE NUMBER |
| 932 | TYPE | INT | 2 | R | PROGRAM TYPE |
| 934 | PRGID | LONG INT | 4 | R | PROGRAM ID |

*FIG. 9B* (CORRECTED)

|     | NAME | TYPE | SIZE | FLAGS | DESCRIPTION |
|---|---|---|---|---|---|
| 1010 | VERSION | INT | 2 | R | PROGRAM TABLE VERSION NUMBER |
| 1012 | STARTDATE | LONG INT | 4 | R | STARTING DATE/TIME OF PROGRAM TABLE |
| 1014 | DURATION | INT | 2 | R | DURATION OF THE PROGRAM TABLE IN MINUTES |
| 1016 | NETCOUNT | INT | 2 | R | NUMBER OF NETWORKS |

*FIG. 10A*     VARIABLE LENGTH PROGRAM HEADER

|     | NAME | TYPE | SIZE | FLAGS | DESCRIPTION |
|---|---|---|---|---|---|
| 1020 | NETREF | LONG INT | 4 | R | NETWORK REFERENCE NUMBER |
| 1022 | COUNT | INT | 2 | R | NUMBER OF PROGRAMS FOR THIS NETWORK |

*FIG. 10B*     VARIABLE LENGTH NETWORK HEADER

|     | NAME | TYPE | SIZE | FLAGS | DESCRIPTION |
|---|---|---|---|---|---|
| 1030 | START | INT | 2 | R | START TIME EXPRESSED AS DIFFERENCE FROM HEADER |
| 1032 | DURATION | INT | 2 | R | DURATION OF PROGRAM IN MINUTES |
| 1034 | TYPE | INT | 2 | R | PROGRAM TYPE |
| 1036 | PRGID | LONG INT | 4 | R | PROGRAM ID |

*FIG. 10C*     VARIABLE LENGTH DATA RECORD

| Genre | Category |
|---|---|
| Comedy | movie |
| | network series |
| | syndicated |
| | TV movie |
| Sports | baseball |
| | basketball |
| | football |
| | hockey |
| | sports related |

1310 — Genre
1320 — Category

*FIG. 13*

| TV DATA 1400 | | 1410 | VCPS 1420 | 1430 |
|---|---|---|---|---|
| TYPE | CATEGORY | | GENRE | CATEGORY |
| MI | COMEDY | | COMEDY | TV MOVIE |
| SY | COMEDY | | COMEDY | SYNDICATED |
| * | FASHION | | ENTERTAINMENT | FASHION |
| * | GARDENING | | ART | HOBBIES |
| * | WEATHER | | NEWS | WEATHER |
| OT | * | | OTHER | OTHER |

*FIG. 14*

|  1810 | 1812 | PROBABILITY 1814 | 1816 |
|---|---|---|---|
| GENRE/CATEGORY | MAN | WOMAN | CHILD |
| ACTION:MOVIE | .40 | .30 | .30 |
| ART:LITERATURE | .30 | .55 | .15 |
| CHILDREN:GAME SHOW | .20 | .20 | .60 |
| NEWS:NEWS | .44 | .36 | .20 |
| SPORTS:BOXING | .80 | .15 | .05 |

*FIG. 18A*

| 1820 | 1822 | ADJUSTMENT 1824 | 1826 |
|---|---|---|---|
| DAY PART | MAN | WOMAN | CHILD |
| WEEKDAY 0100-0500 | 1.0 | 0.9 | 0.0 |
| WEEKDAY 0500-0900 | 1.0 | 1.0 | 0.6 |
| WEEKDAY 0900-1600 | 0.3 | 0.9 | 1.0 |
| WEEKDAY 1600-1800 | 0.6 | 1.0 | 1.0 |
| WEEKDAY 1800-1930 | 1.0 | 1.0 | 1.0 |
| WEEKDAY 1930-2000 | 1.0 | 1.0 | 1.0 |
| WEEKDAY 2000-2300 | 1.0 | 1.0 | 0.8 |
| WEEKDAY 2300-0100 | 1.0 | 1.0 | 0.3 |
| WEEKEND | 1.0 | 1.0 | 1.0 |

*FIG. 18B*

| 1830 | 1840 ADJUSTED PROBABILITY | 1850 ADJUSTED SUM | 1860 PROBABILITY |
|---|---|---|---|
| MAN: | 0.40 X 0.3 = 0.12 |  | 0.12 / 0.69 = 0.174 |
| WOMAN: | 0.30 X 0.9 = 0.27 | .12+.27+.30=.69 | 0.27 / 0.69 = 0.391 |
| CHILD: | 0.30 X 1.0 = 0.30 |  | 0.30 / 0.69 = 0.435 |

*FIG. 18C*

| 1920 | DEMOGRAPHIC GROUPS ~1910 ~1930 | | | | | | | | |
|---|---|---|---|---|---|---|---|---|---|
| | AGE | | INCOME | | | SIZE | | | GENDER |
| | 0-10 | 10-18 ... >70 | 0-20K | 20-50K ... 50-100K | 1 | 2 ... | >5 | M | F |
| NEWS | 0.1 | 0.1 0.4 | 0.2 | 0.3 0.4 | 0.5 | 0.3 | 0.1 | 0.3 | 0.7 |
| FICTION | 0.5 | 0.3 0.2 | 0.4 | 0.2 0.3 | 0.3 | 0.2 | 0.1 | 0.8 | 0.2 |
| FACTUAL | 0.2 | 0.2 0.3 | 0.1 | 0.4 0.2 | 0.2 | 0.2 | 0.4 | 0.4 | 0.6 |
| ... | | | | | | | | | |
| ADVERTISING | 0.1 | 0.3 0.5 | 0.3 | 0.2 0.1 | 0.2 | 0.1 | 0.3 | 0.5 | 0.5 |

CATEGORIES

| AVERAGE VIEWING STATSTICS | |
|---|---|
| VIEWING DURATION | 55 MINUTES |
| CLICK FREQUENCY | 7.7 PER 30 MINUTES |
| HOLDING FACTOR | 27% |

VIEWING DURATION PERCENTAGE
BY DAY OF WEEK AND TIME OF DAY
TOTAL DURATION: 84 HOURS 2255

| PERIOD | M | TU | W | TH | F | SA | SU |
|---|---|---|---|---|---|---|---|
| MIDNIGHT TO 4AM | 0 | 0 | 0 | 0 | 0 | 0 | 0 |
| 4AM TO 8AM | 0 | 0 | 3 | 0 | 0 | 1 | 0 |
| 8AM TO NOON | 6 | 6 | 0 | 8 | 5 | 6 | 0 |
| NOON TO 4PM | 0 | 5 | 3 | 4 | 0 | 1 | 0 |
| 4PM TO 8PM | 0 | 0 | 3 | 3 | 4 | 0 | 2 |
| 8PM TO MIDNIGHT | 2 | 4 | 3 | 2 | 17 | 2 | 0 |

*FIG. 22B*

CHANNEL CHANGE FREQUENCY BY DAY PART
TOTAL CLICKS: 1120 — 2310

| PERIOD | M | TU | W | TH | F | SA | SU |
|---|---|---|---|---|---|---|---|
| MIDNIGHT TO 4AM | 0 | 0 | 0 | 0 | 0 | 0 | 0 |
| 4AM TO 8AM | 0 | 0 | 2 | 6 | 3 | 1 | 0 |
| 8AM TO NOON | 0 | 1 | 0 | 7 | 2 | 3 | 0 |
| NOON TO 4PM | 0 | 1 | 6 | 0 | 0 | 0 | 0 |
| 4PM TO 8PM | 18 | 0 | 12 | 10 | 20 | 0 | 20 |
| 8PM TO MIDNIGHT | 18 | 0 | 15 | 43 | 3 | 4 | 88 |

*FIG. 23*

TOP 20 PROGRAMS BY HOLDING FACTOR 2400

| PROGRAM TITLE | DWELL TIME | DURATION | HOLDING FACTOR |
|---|---|---|---|
| 3RD ROCK FROM THE SUN | 1800 | 1800 | 100 |
| U PICK NICKTOONS | 2955 | 3600 | 82 |
| BLUE'S CLUES | 5078 | 7200 | 70 |
| IN LIVING COLOR | 3930 | 7200 | 54 |
| WILD THORNBERRY'S | 11215 | 21600 | 51 |
| WILL & GRACE | 913 | 1800 | 50 |
| ACTION NEWS WIT JIM GARDNER | 1799 | 3600 | 50 |
| OH YEAH! CARTOONS! | 1799 | 3600 | 49 |
| ROCKET POWER | 8807 | 18000 | 48 |
| RUGRATS | 7546 | 16200 | 46 |
| BRADY BUNCH | 2512 | 5400 | 46 |
| REN & STIMPY | 3266 | 7200 | 45 |

FIG. 24

| 2500 Networks | 2510 Surf #1 | 2520 Surf#2 | 2530 Surf#3 | 2540 Typical Order |
|---|---|---|---|---|
| CNN | 3 | 3 | 2 | 2.67 |
| ESPN | 1 | 1 | 1 | 1.00 |
| HIST | 4 | 5 | - | 4.50 |
| TBS | 5 | 6 | 3 | 4.67 |
| TLC | 2 | 2 | 4 | 2.67 |

| 2500 Network | 2550 Surf Sessions |
|---|---|
| CNN | 2 |
| ESPN | 3 |
| LIFE | 0 |
| TBS | 3 |
| TNT | 1 |
| USA | 0 |

| 2500 Network | 2560 Count | 2570 Total Dwell Time (s) |
|---|---|---|
| CNN | 5 | 17 |
| ESPN | 8 | 39 |
| FX | 3 | 7 |
| HIST | 4 | 26 |
| LIFE | 2 | 2 |
| TBS | 5 | 24 |
| USA | 3 | 19 |

PROFILING AND IDENTIFICATION OF TELEVISION VIEWERS

CROSS REFERENCE TO RELATED APPLICATION

This application is a divisional of U.S. patent application Ser. No. 09/998,979, filed Oct. 31, 2001, and entitled Profiling and Identification of Television Viewers, the entire disclosure of which is incorporated herein by reference.

This application claims the benefit of U.S. Provisional Application Nos. 60/260,946, filed Jan. 11, 2001, entitled Viewer Profiling within a Set-top Box, and 60/263,095, filed Jan. 19, 2001, entitled Session Based Profiling in a Television Viewing Environment, the entire disclosures of which are incorporated herein by reference.

This application is related to all of the Applicants copending applications, patents and publications listed below. The entire list below is herein incorporated in their entirety, but are not admitted to be prior art:

- U.S. application Ser. No. 09/204,888, filed on Dec. 3, 1998, now U.S. Pat. No. 7,150,030 entitled "Subscriber Characterization System";
- PCT Application PCT/US99/28528 (WIPO Publication WO 00/33160A3), filed on Dec. 2, 1999 entitled "Subscriber Characterization and Advertisement Monitoring System";
- U.S. patent application Ser. No. 09/516,983, filed on Mar. 1, 2000, entitled "Subscriber Characterization with Filters";
- U.S. patent application Ser. No. 09/591,577, filed on Jun. 9, 2000, entitled "Privacy-Protected Advertising System";
- U.S. patent application Ser. No. 09/635,252, filed on Aug. 9, 2000, now abandoned, entitled "Subscriber Characterization Based on Electronic Program Guide Data";
- U.S. patent application Ser. No. 09/205,653, filed on Dec. 3, 1998, now U.S. Pat. No. 6,457,010, entitled "Client-Server Based Subscriber Characterization System";
- U.S. application Ser. No. 09/205,119, filed on Dec. 3, 1998, now abandoned, entitled "Advertisement Monitoring System";
- U.S. application Ser. No. 09/516,314, filed on Mar. 1, 2000, now abandoned, entitled "Advertisement Monitoring and Feedback System";
- U.S. application Ser. No. 09/452,893, filed on Dec. 2, 1999, now U.S. Pat. No. 6,684,194, entitled "Subscriber Identification System";
- PCT Application PCT/US99/28600 (WIPO Publication WO 00/33233), filed on Dec. 2, 1999 entitled "Subscriber Identification System";
- U.S. patent application Ser. No. 09/635,253, filed on Aug. 9, 2000, now U.S. Pat. No. 6,714,917, entitled "Subscriber Identification Based on Electronic Program Guide Data";
- U.S. Pat. No. 6,298,348, issued on Oct. 2, 2001, now U.S. Pat. No. 6,298,348, entitled "Consumer Profiling System";
- PCT Application PCT/US99/28628 (WIPO Publication WO 00/33228), filed on Dec. 2, 1999, entitled "Consumer Profiling and Advertisement Selection System";
- U.S. patent application Ser. No. 09/553,637, filed on Apr. 20, 2000, now U.S. Pat. No. 6,820,277, entitled "Advertising Management System for Digital Video Streams";
- PCT Application PCT/US00/10633 (WIPO Publication WO 00/64165), filed on Apr. 20, 2000, entitled "Advertising Management System for Digital Video Streams";
- U.S. patent application Ser. No. 09/553,099, filed on Apr. 20, 2000, now U.S. Pat. No. 6,820,277, entitled "Advertisement Insertion Techniques for Digital Video Streams";
- U.S. patent application Ser. No. 09/568,084, filed on May 10, 2000, now abandoned, entitled "Advertisement Subgroups for Digital Video Streams";
- PCT Application PCT/US00/12710 (WIPO Publication WO 00/69163), filed on May 10, 2000 entitled "Advertisement Subgroups for Digital Video Streams";
- U.S. patent application Ser. No. 09/568,477, filed on May 10, 2000, now U.S. Pat. No. 6,615,039, entitled "Advertisement Subgroups for Digital Video Streams";
- U.S. patent application Ser. No. 09/635,539, filed on Aug. 10, 2000, now abandoned, entitled "Delivering targeted advertisements in cable-based networks";
- U.S. patent application Ser. No. 09/694,848, filed on Oct. 20, 2000, now U.S. Pat. No. 7,068,724, entitled "Method and Apparatus for Inserting Digital Media Advertisements into Statistical Multiplexed Streams";
- PCT Application PCT/US00/29034 (WIPO Publication WO 01/30086A), filed on Oct. 20, 2000, entitled "Method and Apparatus for Inserting Digital Media Advertisements into Statistical Multiplexed Streams";
- U.S. patent application Ser. No. 09/796,339, filed on Feb. 28, 2001, entitled "Privacy-Protected Targeting System";
- PCT Application PCT/US01/06650 (WIPO Publication WO 01/65453A1), filed on Feb. 28, 2001 entitled "Privacy-Protected Targeting System";
- U.S. patent application Ser. No. 09/635,542, filed on Aug. 10, 2000, now abandoned, entitled "Grouping Subscribers Based on Demographic Data";
- U.S. patent application Ser. No. 09/635,544 filed on Aug. 10, 2000, now abandoned, entitled "Transporting Ad Characterization Vectors";
- U.S. patent application Ser. No. 09/712,790 filed on Nov. 14, 2000, entitled "Queue Based Advertisement Scheduling and Sales";
- PCT Application PCT/US01/27217, filed on Aug. 31, 2001, entitled "Targeted Advertising at the Set-Top Box";
- U.S. patent application Ser. No. 09/731,606 filed on Dec. 7, 2000, now abandoned, entitled "System for Providing Targeted Advertisements Using Advertiser Specific Target Groups";
- U.S. patent application Ser. No. 09/748,949 filed on Dec. 27, 2000, now abandoned, entitled "Advertisement Filtering and Storage for Targeted Advertisement Systems";
- U.S. patent application Ser. No. 09/742,527 filed on Dec. 21, 2000, entitled "System and Method for Automatically Managing Avail Inventory Data and Avail Pricing";
- U.S. patent application Ser. No. 09/748,942 filed on Dec. 27, 2000, entitled "Advertisement Distribution System for Distributing Targeted Advertisements in Television Systems";
- U.S. patent application Ser. No. 09/742,506 filed on Dec. 21, 2000, now abandoned, entitled "Internet Based Electronic Program Guide Advertisement Insertion Method and Apparatus";
- U.S. patent application Ser. No. 09/748,943 filed on Dec. 27, 2000, now abandoned, entitled "Delivering Targeted Advertisements to the Set-Top Box";

U.S. patent application Ser. No. 09/742,534 filed on Dec. 21, 2000, now U.S. Pat. No. 7,039,932, entitled "Queue Based Head-End Advertisement Scheduling Method and Apparatus";

U.S. patent application Ser. No. 09/742,852 filed on Dec. 21, 2000, entitled "System for Rescheduling and Inserting Advertisements";

U.S. patent application Ser. No. 09/750,800 filed on Dec. 28, 2000, currently allowed, entitled "System and Method for Delivering Targeted Advertisements Using Multiple Presentation Streams";

U.S. patent application Ser. No. 09/766,004 filed on Jan. 19, 2001, now U.S. Pat. No. 7,185,353, entitled "System and Method for Delivering Statistically Scheduled Advertisements";

U.S. patent application Ser. No. 09/824,434, filed on Apr. 2, 2001, now abandoned, entitled "Grouping of Advertisements on an Advertising Channel in a Targeted Advertising System";

U.S. patent application Ser. No. 09/658,204 filed on Sep. 8, 2000, entitled "Targeted Advertising Through the Electronic Program Guide";

U.S. Provisional Application No. 60/238,059, filed on Oct. 5, 2000, entitled "Platform Independent Addressable Television Advertising System";

U.S. Provisional Application No. 60/238,056, filed on Oct. 5, 2000, entitled "Method and System for Addressable Advertising in the Electronic Program Guide";

U.S. patent application Ser. No. 09/749,255 filed on Dec. 27, 2000, entitled "Scheduling and Linking IPG Ads in Conjunction with Programming Ads in a Television Environment";

PCT Application PCT/US01/31682, filed on Oct. 5, 2001, entitled "Targeting Ads on IPG's Live Programming and Recorded Programming, and Coordinating the Ads therebetween"

U.S. patent application Ser. No. 09/680,622 filed on Oct. 6, 2000, now abandoned, entitled "Method and System for Addressable and Program Independent Advertising During Recorded Programs";

U.S. patent application Ser. No. 09/751,349 filed on Dec. 28, 2000, now abandoned, entitled "Inserting Local Signals During MPEG Channel Changes";

U.S. Provisional Application No. 60/267,370, filed on Feb. 8, 2001, entitled "Presentation Stream Switching Using Channel Maps";

U.S. Provisional Application No. 60/278,612, filed on Mar. 26, 2001, entitled "Formation and Utilization of Cable Microzones";

U.S. Provisional Application No. 60/281,037, filed on Apr. 3, 2001, entitled "Personal Video Recorder (PVR) Market Overview and Advertising Opportunities";

U.S. Provisional Application No. 60/329,992, filed on Oct. 17, 2001, entitled "Personal Video Recorder (PVR) System Requirements and Specification";

U.S. patent application Ser. No. 09/928,024 on Aug. 10, 2001, entitled "Targeting Ads to Subscribers based on Privacy Protected Subscriber Profiles"; and PCT Application PCT/US01/25261, filed on Aug. 10, 2001, entitled "Targeting Ads to Subscribers based on Privacy Protected Subscriber Profiles".

BACKGROUND OF THE INVENTION

Advertising forms an important part of broadcast programming including broadcast video (television), radio and printed media. The revenues generated from advertisers subsidize and in some cases pay entirely for programming received by subscribers. For example, over the air broadcast programming (non-cable television) is provided entirely free to the subscribers and is essentially paid for by the advertisements placed in the shows that are watched. Even in cable television systems and satellite-based systems, the revenues from advertisements subsidize the cost of the programming, and were it not for advertisements, the monthly subscription rates for cable television would be many times higher than at present. Radio similarly offers free programming based on payments for advertising. The low cost of newspapers and magazines is based on the subsidization of the cost of reporting, printing and distribution from the advertising revenues.

Along with the multitude of programming choices that the television viewer faces, the viewers are subject to advertisements. While advertisements are sometimes beneficial to subscribers and deliver desired information regarding specific products or services, consumers generally view advertising as a "necessary evil" for broadcast-type entertainment. A prior art (present model) of providing advertisements along with actual programming is based on linked sponsorship. In the linked sponsorship model, the advertisements are inserted into the actual programming based on the contents of the programming, e.g., a baby stroller advertisement may be inserted into a parenting program. Even with linked sponsorship, advertising, and in particular broadcast television advertising, is mostly ineffective. That is, a large percentage, if not the majority, of advertisements do not have a high probability of affecting a sale. In addition to this fact, many advertisements are not even seen/heard by the subscriber who may mute the sound, change channels, or simply leave the room during a commercial break. The reasons for such ineffectiveness are due to the fact that the displayed advertisements are not targeted to the subscribers' needs, likes or preferences. Generally, the same advertisements are displayed to all the subscribers irrespective of the needs and preferences of the subscribers.

In order to deliver more targeted programming and advertising to subscribers, it is necessary to understand their likes and dislikes to a greater extent than is presently done today. Targeting of an ad requires knowing certain attributes of the target viewer, demographic, psychograph, and any data relevant to determining the relative appropriateness of an ad for the particular viewer. Systems which identify subscriber preferences based on their purchases and responses to questionnaires allow for the targeted marketing of literature in the mail, but do not in any sense allow for the rapid and precise delivery of programming and advertising which is known to have a high probability of acceptance to the subscriber. In order to determine which programming or advertising is appropriate for the subscriber, knowledge of that subscriber and of the subscriber's programming preferences is required. Characterizing or profiling viewers based on viewing habits may be used to achieve targeted advertising.

Methods for monitoring the viewing habits of television viewers, for classifying TV programming into categories, and for using the viewing habits for determining viewing preferences have been previously disclosed. For example The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

Bedard (WIPO publication WO 98/21877A2), assigned to Hyundai Electronics of San Jose, Calif., discloses a method for monitoring a viewer's viewing habits in order to arrange an electronic program guide (EPG) and determine viewing preferences;

Barton et al. (WIPO publication WO 00/59223), assigned to TIVO, Inc. of Alviso, Calif., discloses a data storage and scheduling system in a personal video recorder (PVR). Based on past viewing habits/preferences, the PVR automatically records desired programs; and Maissel et al. (WIPO publication WO 99/01984A1), assigned to NDS Limited of Middlesex, England, discloses a method of customizing the EPG by monitoring viewing behavior to create a preference profile.

A method for delivering targeted ads to different demographic groups in a television environment was disclosed by Wachob (U.S. Pat. No. 5,155,591), assigned to General Instrument of Hatboro, Pa. Wachob discloses a cable television system for broadcasting different commercial messages to different demographically targeted audiences. Demographic information is obtained and targeted audiences are formed based on subscriber address (i.e., geographic location) or on household survey information such as a viewing habit diary kept by the subscriber.

Methods for delivering advertising or other customized programming to viewers in a television environment based on previous viewing habits or menu selections has previously been disclosed. For example, Despain et al. (WIPO publication WO 00/14951), assigned to Next Century Media, Inc. of New Paltz, N.Y., discloses a system for targeted advertising in a digital system. In the system, a digital set-top box (STB) captures and uploads household data viewing preferences to the cable operator head end, which can then be used to deliver targeted ads and other content to the viewer based on the viewer preferences. An on-screen questionnaire is used to elicit demographic attributes and preferences from viewers. "Boo" and "applause" buttons on the remote control are used by the viewer to indicate viewer likes/dislikes. Channel change data can be captured and sent upstream, and in conjunction with data from the questionnaires and interactive buttons, may be used to provide each viewer with their own custom menu and forms of customized programming. However, Despain et al. do not teach local storing and processing of data to generate a viewer profile to be stored and utilized at the STB. Moreover, it does not teach specific methods on how to create a demographic, psychographic or other viewer profile from a multitude of viewer interaction data or how to correlate or use those profiles for the delivery of targeted advertisements.

A preference agent for monitoring television programs watched by a viewer is disclosed in Gogoi et al. (WIPO publication WO 99/65237), assigned to Metabyte, Inc. of Freemont, Calif. The preference agent, located within a STB or PVR, also retrieves category information about viewed programs, and generates a viewer program preference profile. The preference agent automatically records or suggests programs of interest to the viewer based on the viewer's program preference profile.

The creation of user profiles on an interactive computer is disclosed in Freeman et al. (U.S. Pat. No. 5,861,881), assigned to ACTV Inc., of Freeman, N.Y. The profiles are based on the selections made during one of the interactive programs, however, are limited to interactive program activity by the viewer, and are not based on general viewing habits or general surf activity.

Hendricks et al. (U.S. Pat. No. 6,160,989), assigned to Discovery Communications Inc., of Bethesda, Md., discloses a network controller that provides monitoring and control of STBs. The network controller also gathers data received from the STBs to compile subscriber viewing information and programs watched information. The data is processed to generate packages of advertisements, as well as account and billing reports, targeted towards each STB. To build a personal profile, the viewer answers a series of questions presented on a series of questionnaire menu screens.

Barton et al. (WIPO publication WO 00/59223), assigned to TIVO Inc. of Alviso, Calif., disclose a data storage and scheduling system, wherein viewing preferences can be inferred from viewing patterns, and where the navigation actions of the TV channels by the viewer are recorded, stored, and then sent upstream. However, Barton et al. do not teach or suggest local profiling or viewer identification, or how profiles could be utilized to delivery targeted advertising.

For the foregoing reasons, a need exists for a method and system for monitoring click-stream and other interactivity of a viewer with the viewer's television viewing environment and generating one more viewer profiles therefrom. Additionally, a need exists for the monitoring of interactivity and generation of viewer profiles to be performed within the television viewing environment (i.e., TV, STB, PVR). Furthermore, a need exists for such profiling to be done in a secure and privacy-protected manner. Moreover, a need exists for a reliable way of automatically, detecting or inferring, which specific individual or individuals, are actually watching the TV in a household comprising more than one individual at a particular time, and for generating one or more profiles per each individual.

SUMMARY OF THE INVENTION

The invention comprises a method of characterizing or profiling one or more viewer's, by monitoring and processing at the viewer set-top or receiver, each viewer's interactivity (e.g., via a remote control unit) with the set-top receiver, and then generating one or more profiles for each viewer based on one or more of the multitude of interactions of each viewer and on, in general, the viewing habits and preferences of the viewer. The invention further comprises a method of automatically and reliably, detecting or inferring at a particular time, which specific individual or individuals, are actually watching (i.e., interacting with the remote) the TV in household comprising more than one individual. Such viewer identification and profile generation can be used to facilitate the delivery of targeted content including targeted advertising.

The invention also comprises a system for carrying out the local (i.e., at the set-top) profiling of viewers based on their viewing preferences and other interactions at the set-top and for distinguishing between viewers in a multi-viewer household. The invention further comprises a profiler or profiling agent, resident at the viewer's receiver or set-top, and whereby the click-stream and other interactivity by a viewer can be monitored and processed to generate one more viewer profiles and for distinguishing between viewers in a multi-viewer household.

In a preferred embodiment, the profiling agent is resident at a viewer's receiver and is responsible for profiling a single household, and distinct individual members of that household. The set-top box profiler monitors the viewing behavior and other receiver interactivity of the viewers including their viewing preferences and utilizing data about programming viewed or not viewed, derives characteristics about and generates profiles of the household and of individual viewers within the household. In a preferred embodiment, the profiles are comprised of profile categories, including the categories of preferred programs, preferred networks, viewing duration, channel change frequency, and holding factor per program or program category. The program data may be delivered to the set-top box periodically (e.g., on a carousel) or may be delivered with the video (e.g., in the VBI or in the PSI).

In a preferred embodiment, the profiler identifies different viewing sessions, a period of time during which viewership is static and does not change (i.e., a session of one or more specific viewers), based on viewing and other habits and preferences exhibited by the viewer or viewers, and creates session profiles for each session. Signature profiles are created from one or more correlated session profiles, and subsequent session profiles are correlated and matched with existing signature profiles. Sessions (or session durations) may be defined by, for example, the cycling of power (on/off) of the set-top box, a specific window of time or day-part, periods of inactivity, and monitoring channel change, viewing and other viewer activity.

In one embodiment, the profiler comprises an event queue that stores viewer interactivity as viewer-generated events. The profile engine accepts events from the event queue, reads database information (e.g., program data), and processes the events to produce the subscriber profiles. Events are dispatched to the profiling engine based on the clock time, and each of these events may be used to update and modify the viewer's profile. In a preferred embodiment the profile engine uses filters to process events. Each filter may handle one or more profiles elements, determining whether or not each specific event is applicable to (i.e., should be used to update) one or more profiles.

In one embodiment, automatic session detection uses channel change and other information to dynamically determine which viewer is watching television at any given time. In a preferred embodiment, reliable viewer identification is accomplished and more complete, updated and accurate profiles of particular viewers are generated, by combining current session data with historical data for those viewers. This historical data, or signature, is an aggregation of session data for a particular viewer or type of viewer, and reflects a set of viewing and interactivity habits. During a specific session, as the profiler collects viewer interactivity session data, the profiler continuously correlates the session data with existing signature data in order to match the session data to a specific signature. This correlation associates long term viewing habits with a particular user based on their short term viewing habits. Moreover, matching session data with a signature identifies a particular viewer and an associated profile.

In one embodiment, the signature profile represents an individual viewer. In an alternate embodiment, the signature profile represents a plurality of household viewers. In another embodiment, the signature profile is a standard profile, created independently of any session data or created from aggregated session data from a plurality of household.

Default or standard signature profiles, comprising standard profile categories may be generated, independent of local viewing sessions, and may be downloaded to the local receiver or set top. Local viewing session profiles are correlated with these standard signature profiles to identify one or more particular attributes of the session viewer.

Advantages of the invention include the ability to, based on viewing habits and other interactions, identify individual viewers or groups of viewers that possess or share certain preferences, demographic, or other relevant traits, and the ability to identify one or more particular viewers, from among a larger group of viewers, and to reliably identify whether that viewer is a man, a woman, or a child. The identification of specific viewers, based on each viewers current and previous interactivity with a receiver, and the characterization (profiling) of each of those viewers (or groups of viewers) creates enormous opportunities for content providers and advertisers to address their content to an individual or groups of individuals with particular demographic traits or who have particular interests. An additional advantage of the invention is that the local monitoring and profile generation at the set-top is consistent with and affords solutions to security and privacy considerations.

These and other features and objects of the invention will be more fully understood from the following detailed description of the preferred embodiments that should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the Drawings:

FIGS. 3A-B illustrate an exemplary head-end channel map table format and channel map table respectfully, according to one embodiment;

FIGS. 4A-B illustrate an exemplary head-end network table format and network table respectfully, according to one embodiment;

FIGS. 5A-B illustrate an exemplary head-end BpID table format and BpID table respectfully, according to one embodiment;

FIGS. 6A-B illustrate an exemplary head-end program table format and program table respectfully, according to one embodiment;

FIGS. 7A-B illustrate an exemplary set-top box (STB) channel map header format and channel map table format respectfully, according to one embodiment;

FIGS. 9A-B illustrate exemplary STB fixed length program header format and fixed length program record format respectively, according to one embodiment;

FIGS. 10A-C illustrate exemplary STB variable length program header format, network record format, and program record format respectively, according to one embodiment;

FIG. 13 illustrates an exemplary subset of genres and categories as defined by the VCPS, according to one embodiment;

FIG. 14 illustrates an exemplary conversion of program data, according to one embodiment;

FIGS. 18A-C illustrate exemplary tables for probabilities based on program categories, adjustments to those probabilities based on day part, and normalization of the adjusted probabilities respectively, according to one embodiment;

FIG. 19 illustrates an exemplary set of conditional probabilities for different genres, according to one embodiment;

FIGS. 22A-B illustrate exemplary average viewing duration profile table and graph respectively, according to one embodiment;

FIG. 23 illustrates an exemplary channel change frequency by day part profile, according to one embodiment;

FIG. 24 illustrates an exemplary holding factor profile, according to one embodiment;

DETAILED DESCRIPTION OF THE PREFERRED EMBODIMENT

Figure 1:
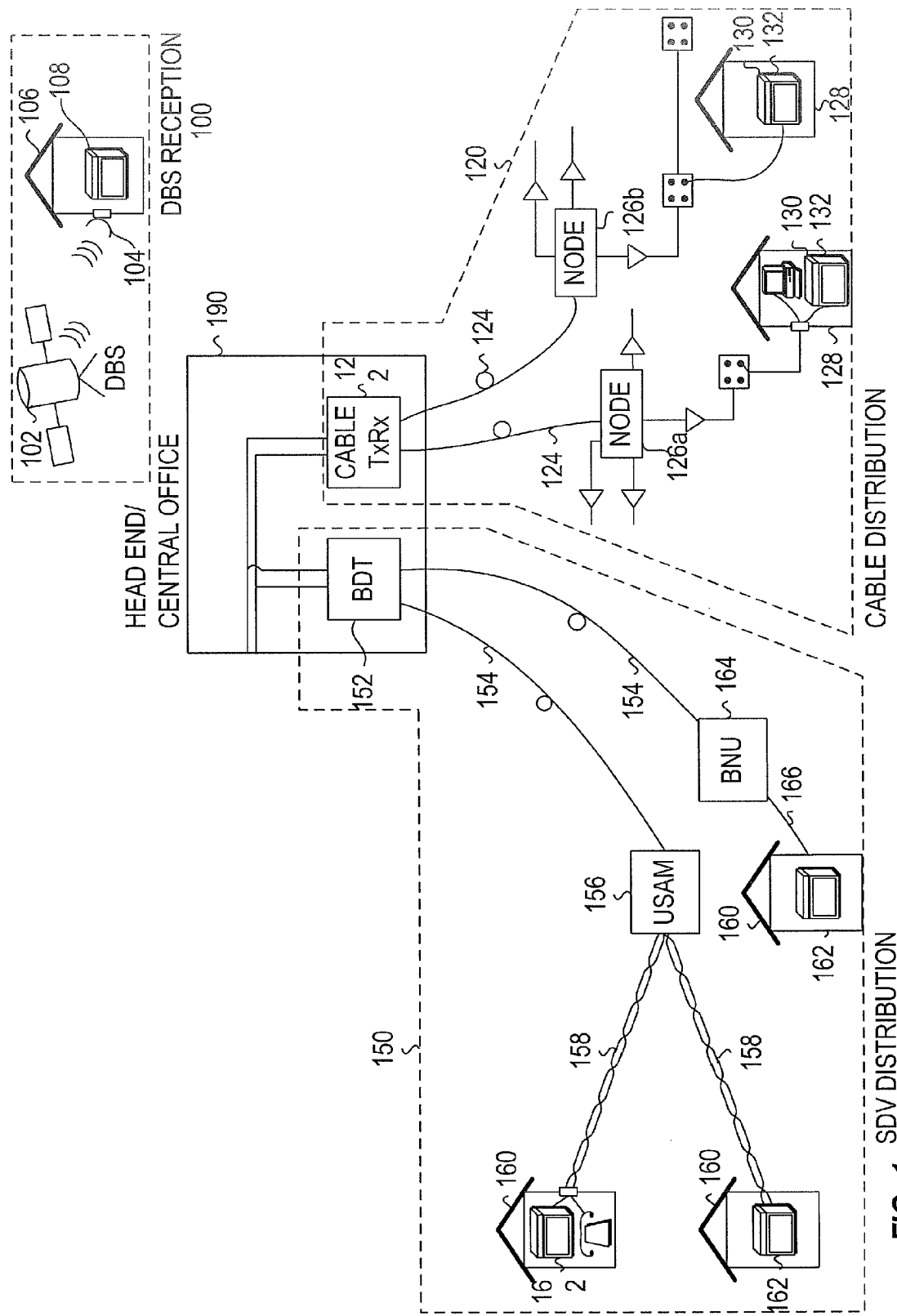
FIG. 1 illustrates exemplary television delivery networks for which the current invention could be implemented.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 35 in particular, the method and apparatus of the present invention is disclosed.

The present invention can be implemented for use with various television (TV) delivery systems including, but not limited to, digital broadcast satellite (DBS) systems, switched digital video (SDV) systems, local multipoint distribution systems (LMDS), multichannel multipoint distribution systems (MMDS), hybrid fiber coax (HFC) systems, the Internet, other cable TV (CTV) systems, or other terrestrial wireless networks. The TV delivery system can deliver programming in various forms, including but not limited to digital video, analog video, or streaming media. The programming may be compressed in accordance with a variety of now known or later discovered compression standards, such as the current Motion Picture Expert Group (MPEG-2) standard for digital video.

FIG. 1 illustrates exemplary embodiments of three of the most common types of TV delivery networks discussed above with respect to FIG. 1 with which the present invention can be suitably used. These include DBS 100, CTV 120, and very high-speed digital subscriber line (VDSL) 150. A DBS system 100 transmits a programming stream comprising upwards of a hundred channels of TV programming directly from a geo-stationary satellite transmitter 102 orbiting the earth to a receiving antenna 104 mounted on or near each subscriber's house 106. The programming stream is transmitted from the antenna via a cable (not shown) to a satellite receiving station 108 in the form of a set-top box (STB) in the subscriber's house 106. The satellite receiving station (i.e., STB) 108 selects a channel and demodulates the signal for delivery to a monitor 110, such as a television. Most DBS systems 100 are arranged such that data also can be sent in the upstream direction, that is, from the STB 108 to the DBS provider. In most DBS systems 100, the STB 108 also is coupled to the telephone line and is designed and programmed to place telephone calls to the DBS service provider to periodically send information in the upstream direction. Such information commonly may comprise requests for Pay-Per-View (PPV) programs, requests for changes in the subscription (a request that one or more of premium channels be added to the service, etc.).

A CTV network 120, such as digital cable network, transmits multiple channels of TV information from a head end or central office (HE/CO) 190 via a cable network 122. Particularly, the channels are transmitted via cables 124, such as fiber optic cables, to nodes 126. The nodes are essentially switching/routing stations that service multiple homes (usually a few hundred). The nodes 126 route the signals to individual subscribers 128. For digital cable, the individual subscribers 128 will have STBs 130 that select a particular channel from the transmit stream, demodulate it and forward it for display on one or more monitors (i.e., televisions) 132. Upstream information may be sent from the STB 130 to the HE/CO 190 via a dedicated upstream channel over the cable. In cable systems that do not support two-way communication, the upstream "channel" can be through the telephone as described above in connection with DBS systems 100.

A VDSL system 150 transmits TV programming over the regular telephone network. Particularly, TV signals are transmitted from a broadband distribution terminal (BDT) 152 within the HE/CO 190 via cables 154, such as fiber optic cables, to a universal service access multiplexer (USAM) 156 that delivers the data to multiple individual subscriber households 160 via regular telephone twisted wire pair 158 using VDSL modems and protocols. The USAM 156 receives a wide bandwidth signal comprising some or all of the television channels. However, because of the bandwidth limitations of twisted pair wire, typically only about one channel of television programming at a time can be delivered from the USAM 156 to the household. Accordingly, the subscriber has a STB 162 that is similar in functionality to the previously discussed STBs for DBS and CTV, except that when the user changes channels such as by operating a remote control, the remote channel change signal is received by the STB 162 and transmitted to the USAM 156 which switches the channel for the user and begins sending the newly selected channel to the household. Such systems are known as SDV systems. SDV systems are essentially fully modern asynchronous two-way communication networks. Accordingly, the STB 162 can transmit information upstream via the same VDSL modem that receives the downstream signals. SDV systems typically operate using an asynchronous transfer mode (ATM) protocol that is well-known in the networking arts.

In an alternative embodiment, the TV signals are transmitted from the BDT 152 to a broadband network unit (BNU) 164. The BNU 164 delivers the data to individual households 160 using coaxial cable 166.

It should be noted that STBs are described above with reference to FIG. 1. The current invention may be incorporated in an STB but may also be incorporated in other devices that can perform the same, similar, or additional functions. These devices may include, but are not limited to, TV, Video Cassette Recorder (VCR), Digital Video Recorder (DVR), Personal Video Recorder (PVR), Residential Gateway (RG), and computers. For simplicity the term STB will be used herewithin to cover all the various devices.

Figure 2A:
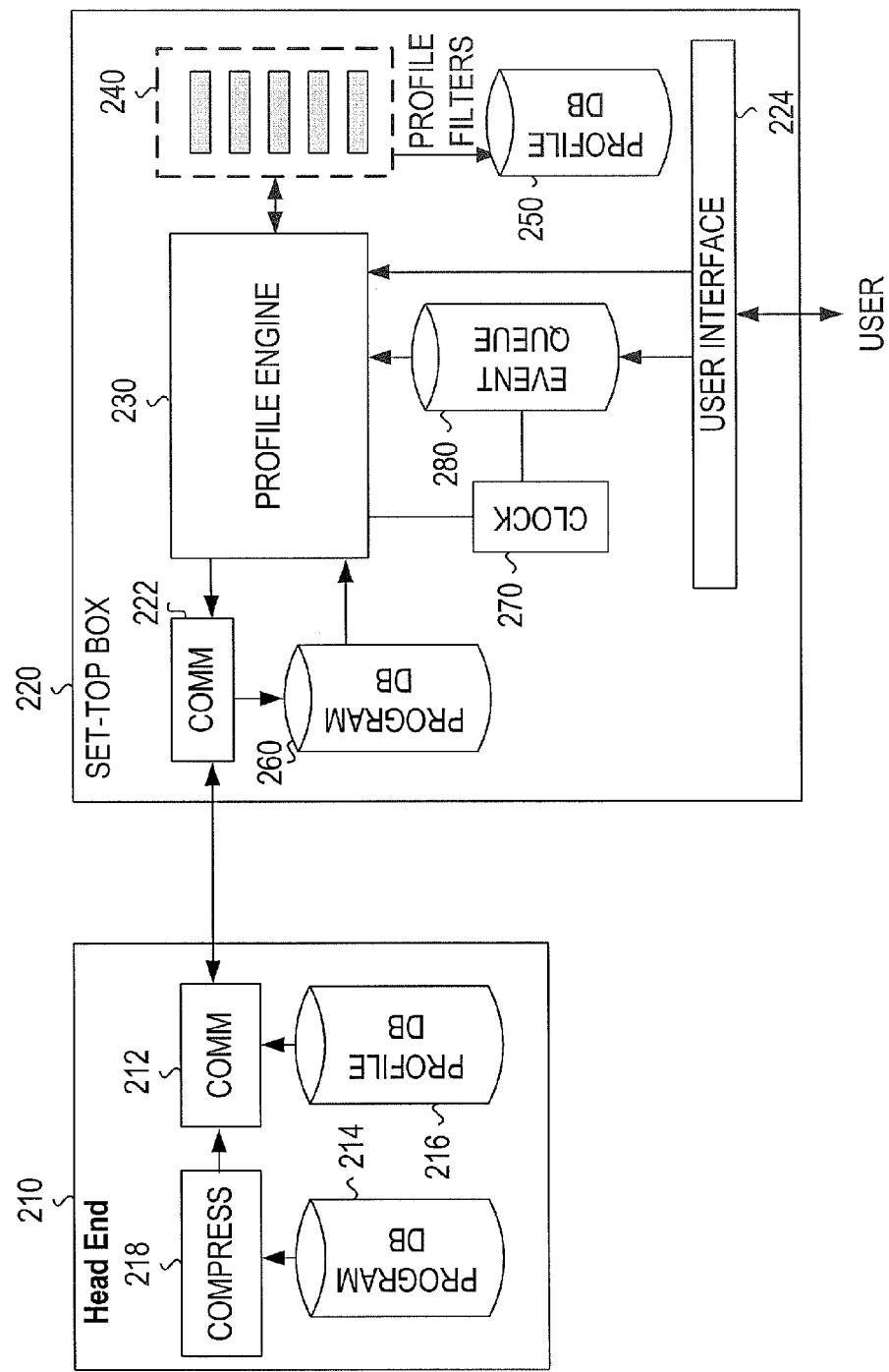
FIG. 2A illustrates an exemplary system diagram and architecture of the current invention, according to one embodiment.

FIG. 2A illustrates an exemplary system diagram and architecture of the current invention, according to one embodiment of the invention. As illustrated, the architecture includes a HE 210 and a STB 220. The HE 210 delivers program content to the STB 220 and may receive commands, such as channel change commands, or viewer profiles 199 from the STB 220. The HE 210 includes a communications manager 212, a program database 214 and a profile database 216. In one embodiment, the HE 210 also includes a compressor 218. The communications manager 212 handles the communications with the STB 220, including packaging and delivering program content to the STB 220 and receiving data, such as commands or profiles, from the STB 220. The program database 214 stores information about the programs to be broadcast. The profile database 216 stores profiles for multiple households connected thereto. The profile database may group or cluster profiles according to similarity. The compressor 218 is used to compress program information prior to being transmitted to the STBs 220.

The STB 220 receives program content from the HE 210 and delivers the program content to the TV, receives and processes commands from a viewer, and monitors the interactions of the viewer to generate viewer profile(s). The STB 220 includes a communications manager 222, a user interface 224, a profile engine 230, profile filters 240, a profile database 250, a program database 260, a clock 270, and an event queue 280.

The communications manager 222 handles the communications with the HE 210. The communications manager 222 may receive program content or database downloads (i.e., program data, channel maps) from the HE 210 and may transmit commands (i.e., channel changes), profiles (i.e., updated), or other information including anonymous system statistics (i.e., audience measurements). The user interface 224 allows the viewer to interact with the STB 220, for example, via a conventional remote control unit. The viewer interactions include, but are not limited to, channel and volume changes, EPG activity, and participation in interactive entertainment and advertisements.

The program database 260 stores program data including, but not limited to, name, network, time, and genre of programs being transmitted or to be transmitted from the HE 210. The event queue 280 stores both viewer-generated events and internal events. Viewer-generated events include viewer interactions as mentioned above. Internal events include, but are not limited to, the end of a program or the end of a day part. The clock 270 runs independently within the system. The clock 270 is used to mark the time that the viewer generated events occur and to trigger internal events, such as, program changes, end of day parts, and change of day. The events are dispatched from the event queue 280 to the profiling engine 230 based on the clock 270.

The profile engine 230 accepts events from the event queue 280 and, if applicable, retrieves program data related to a selected program from the program database 260. The profile engine 230 in conjunction with the profile filters 240, processes the events to produce the viewer profiles 199 which are then stored in the profile database 250. Each of the profile filters 240 handles a single profile element (as will be described further herein).

It should be noted that typical STBs likely include some type of user interface and network interface (i.e., communications manager). The communications manager 222 and the user interface 224 may be typical components of a STB or slight modifications thereof. Also, the clock 270 may be standard component of a STB. The profile database 250, the program database 260 and the event queue 280 may be a single memory device or may be separate memory devices. The profile engine 230 and the profile filters are resident software applications stored and running on the STB 220. As one of ordinary skill in the art would know, there are numerous variations of this architecture that are well within the scope of the current invention.

The term program data in the context of the present invention is meant to include and encompass one or more subsets of information, which identifies, describes and generally characterizes specific television programs and television networks, categories of programs and networks, etc. Program data can be readily obtained from several commercial enterprises including TVData of Glen Falls, N.Y. In a preferred embodiment, program data is used in order to be able to characterize what program and networks are viewed, surfed, or the like. For instance, program data is used to convert channel, date, and time into a program name and content type. This information determines the types of programs that are preferred by a household and how long certain programs hold their attention.

In a preferred embodiment, the HE 210, or other upstream system, generates and stores the program database 214 and transmits relevant program data to the STB 220. According to one embodiment, the relevant program data are placed on a download carousel, where they are transmitted in their entirety to the STB 220. Alternatively, the relevant program data can be downloaded periodically in smaller increments. In another embodiment, the program data is transmitted with the programs. For example, the program data is transmitted within the vertical blanking interval (VBI) or the program specific information (PSI) of a transport stream, such as, a Motion Picture Expert Group (MPEG-2) transport stream. It should be understood however, that many alternate methods for getting the program data exist and the utility and scope of the present invention is not limited by how the data is obtained.

In one embodiment, the HE 210 aggregates the program data by cable supplier, date, time, and television network to produce a variety of tables. These tables or a variation thereof are downloaded to the STB 220. Furthermore, the STB 220 may receive program data in one format and subsequently process the downloaded program data to produce other tables and alternate formats. As will be evident to those skilled in the art, the format of the program data at the HE 210, the format by which it is downloaded to the STB 220, and the format of the program data stored at the STB 220 can be widely variable. The invention is in no way limited to the specific formats discussed and illustrated below.

Figure 2B:
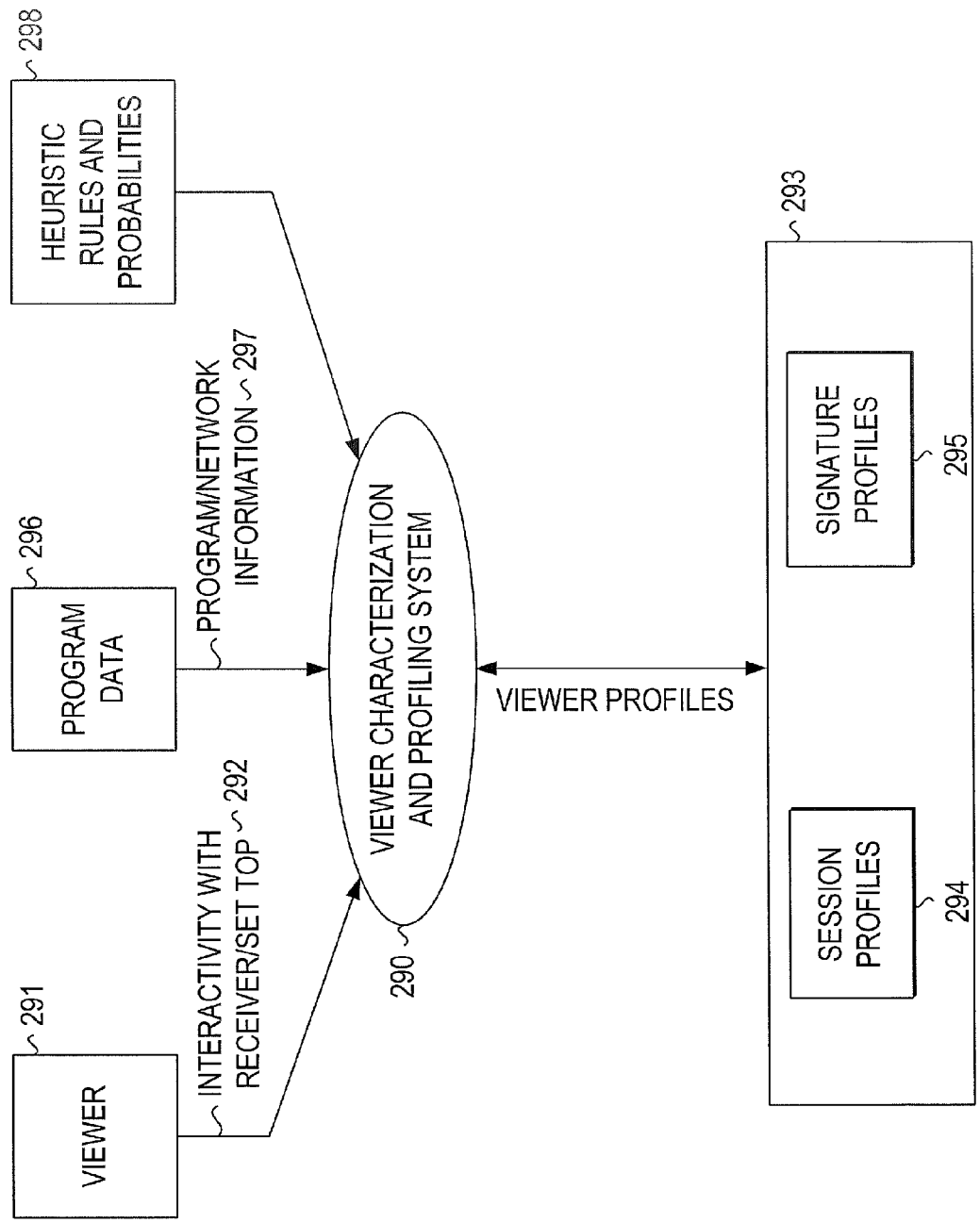
FIG. 2B illustrates an exemplary context diagram of a Viewer Characterization and Profiling System (VCPS), according to one embodiment.

FIG. 2B depicts a context diagram of a Viewer Characterization and Profiling System (VCPS) 290 according to one embodiment of the invention. The VCPS 290 monitors interactivity 291 of one or more viewers 292 with the TV. The interactivity includes, but is not limited to, channel changes, volume changes, EPG activity, and power on/off events. According to one embodiment, the VCPS 290 generates one or more viewer profiles 293 (session profiles 294 and signature profiles 295) based on the interactivity. The viewer profiles 293 identify characteristics about one or more categories of viewing habits of the user, including but not limited to, channel change rate, dwell time, amount of TV watched, volume habits, and EPG habits. According to another embodiment, the VCPS 290 uses program data 296, such as program and network information 297 (i.e., stored in program database 260), to further define the viewer profiles 293 to include viewing preferences related to specific networks, program types, and programs. According to another embodiment, the VCPS 290 utilizes heuristic rules 298 to further define the viewer profiles to infer preferences and demographic traits of the viewer.

The session profiles 294 identify characteristics about the user (or group of users) for that particular viewing session. The signature profiles 295 are a compilation of closely related session profiles 294 (are associated with the same user or group of users). The VCPS 290 can identify which user (or group of users) are interacting with the TV by correlating the current session profile 294 with one or more signature profiles 295. The session profile 294 is identified with the signature profile 295 having the highest correlation, as long as it meets a predefined correlation threshold. The identification is an identification of preferences and not necessarily an actual identification of the user (or users). The viewer profiles 293 can be used for a variety of purposes including, but not limited to, delivering targeted content including advertising and for distinguishing a particular viewer from a household of multiple viewers.

FIGS. 3A and 3B illustrate an exemplary channel map table format and channel map table that may be stored in the program database 214. As illustrated in FIG. 3A, the channel map table format includes for each field a column for name 300, type 302 (i.e., integer, string), size 304 (number of bytes), flags 306, and description 308. The fields captured in the channel map table include user perceived channel indicator (UPCI) 310 and broadcast program ID (BpID) 312, which are both required 2 byte integers. The UPCI 310 is the channel number illustrated on the front panel of the STB 220 and the BpID 312 is a service provider's reference number for a particular network or presentation stream. As illustrated in FIG. 3B, the table simply converts the UPCI 310 that the viewer recognizes into the BpID 312 that the HE 210 recognizes. For example, a UPCI of 02 is a BpID of 27.

FIGS. 4A and 4B illustrate an exemplary network table format and network table that would be stored in the program database 214. As illustrated in FIG. 4A, the network table format includes for each field a column for name 400, type 402 (i.e., integer, string), size 404 (number of bytes), flags 406, and description 408. The fields captured in the network table include network ID (NET_ID) 410, network name (NET_NAME) 412, network call sign (NET_CALL) 414, and network reference (NET_REF) 416. Each of the fields has the characteristics defined in the table. For example, the NET_ID 410 is a 4-byte long integer that is a unique and required field. FIG. 4B illustrates how for each NET_NAME 412 and NET_CALL 414 there is a unique NET_ID 410 assigned and potentially a unique NET_REF 416. For example, WHYY FOX Philadelphia is assigned a NET_ID of 0001, but does not have a NET_REF.

FIG. 5A illustrates an exemplary BpID table format for a BpID table that would be stored in the program database 214. As illustrated, the BpID table format includes a column for name 500, type 502, size 504, flags 506, and description 508. The fields captured in the BpID table include a unique record ID (BID_ID) 510, the BpID (BID_BPID) 512, a broadcast domain number (BID_BDMNUM) 514, and the NET_ID (BID_NETID) 516. Both the BID_BDMNUM 514 and the BID_NETID 516 are foreign keys that point to the network table (FIG. 4B) and a broadcast table (not illustrated) respectively. FIG. 5B illustrates an exemplary BpID table.

FIG. 6A illustrates an exemplary program table format for a program table that would be stored in the program database 214. As illustrated, the program table format includes a column for name 600, type 602, size 604, flags 606, and description 608 columns. The fields captured in the program table include a unique program ID (PRG_ID) 610, program start time (PRG_START) 612, program end time (PRG_END) 614, the NET_ID (PRG_NETID) 616, and program title (PRG_TITLE) 618. The program table contains the program data provided by, for example, TVData. As such, the program table should also include the program type and program category (not illustrated) that TVData uses to classify programs. FIG. 6B illustrates an exemplary program table.

As would be understood by those of ordinary skill in the art, the STB 220 will likely not have sufficient memory to store the entire program database 214 in the program database 260. As such, either the HE 210 will modify the program database 214 and transmit the modified database to the STB 220 or the HE 210 will transmit the entire program database 214 and the STB 220 will process the data and store a modified version thereof. In either event, exemplary headers and table formats for the STB 220 are discussed below.

Within the STB 220 the channel map and the network tables can be combined into a single table that would be specific to a local service domain or zone. FIG. 7A illustrates an exemplary channel map header format. As illustrated, the channel map header format includes for each field a column for name 700, type 702 (i.e., integer, string), size 704 (number of bytes), flags 706, and description 708. The fields captured in the channel map header include channel map version (version) 710, number of records in the channel map (count) 712 and size in bytes of the record (size) 714.

FIG. 7B illustrates an exemplary channel map record format. As illustrated, the channel map record format also includes a column for name 700, type 702, size 704, flags 706, and description 708. The fields captured in the channel map record include UPCI 730, BpID 732, network call sign (netcall) 734, network reference number (netref) 736, and an index of the network in a program table (netidx) 738. The netidx 738 has a different meaning based on whether the program database 260 has a fixed or variable number of records (discussed below). As one skilled in the art would recognize, the channel map table size would be the number of presentation streams multiplied by the record size plus the header size. As illustrated the header is 6 bytes and the record is 24 bytes, so if there were 200 presentation streams the channel map table would be 4806 bytes.

Figure 8:
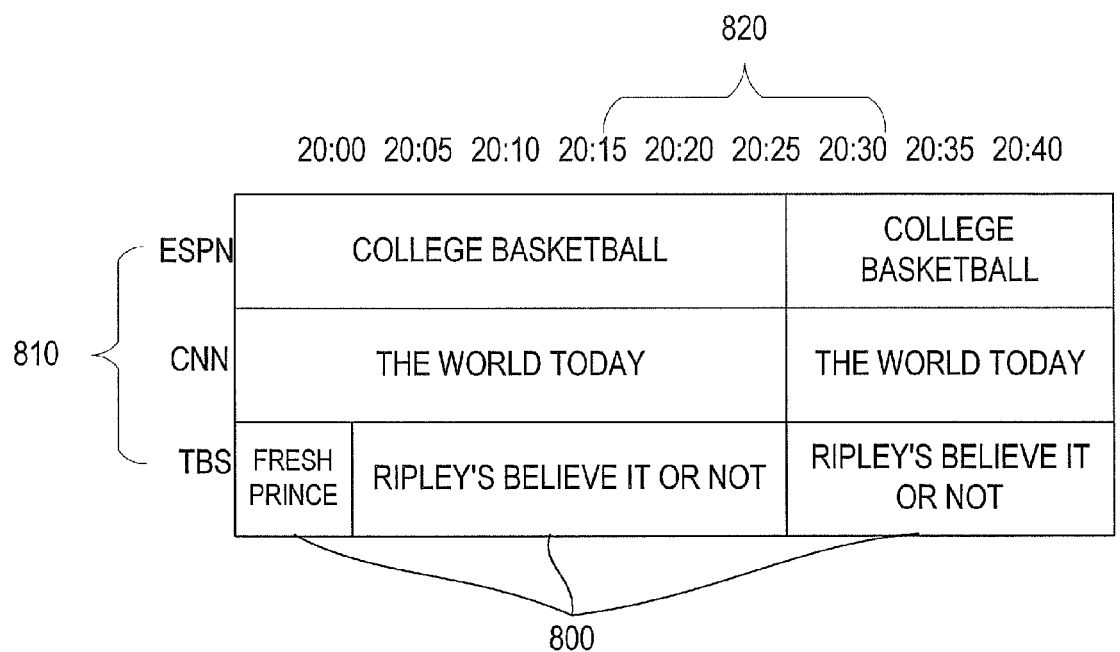
FIG. 8 illustrates an exemplary program schedule.

A program table within the STB 220 may be either a fixed or variable length table. For a fixed length program table the time period covered will be divided into time slots of equal length, for example, 5 minutes, 10 minutes, 30 minutes. As would be obvious to one skilled in the art the granularity depends on the amount of storage in the STB 220. The fixed length program table stores information about the programs appearing in those slots for each of the networks. It is possible that one network may have multiple programs during a single time slot. In those cases, the program table captures the program that airs for the majority of the time slot. For example, FIG. 8 illustrates an exemplary program schedule displaying programs 800 airing for each of three networks 810 for the 8:00 to 8:30 time slot 820. While ESPN and CNN each only have one program during this time slot, TBS has two different programs airing in this time slot, since TBS programs are aired at 5 and 35 minutes past the hour. The program data table would assign Ripley's Believe It or Not! to the 8:00 time slot since it covers 25 of the 30 minutes of that slot.

The fixed record size and fixed slot size allow the VCPS 290 to very rapidly locate the program information for the network at the given time. The fixed length program table is also easily divided into one or two hour increments. This enables the program data for the current time to be transmitted to the STBs 220 quickly and often. In a fixed length table, each network has only one entry per time slot. The program data is found by locating the start of the time slot corresponding to the event time and adding the netidx 738.

FIG. 9A illustrates an exemplary fixed length program header format. As illustrated, the fixed length program header format includes for each field a column for name 900, type 902, size 904, flags 906, and description 908. The fields captured in the fixed length program header include program table version number (version) 910, number of minutes per slot (slotsize) 912, number of slots (slotcount) 914, starting date/time of the program table (startdate) 916, and number of networks per slot (netcount).

FIG. 9B illustrates an exemplary fixed length program record format. As illustrated, the fixed length program record format also includes a column for name 900, type 902, size 904, flags 906, and description 908. The fields captured in the fixed length program record include network reference number (netref) 930, program type (type) 932 and the program ID (prgid) 934. The netref 930 verifies that the channel map corresponds to the program table by requiring that this field match the like-named netref field 736 in the channel map corresponding to the network reference number. The prgid 934 is a host-assigned unique program ID, and is used to calculate the holding factor for programs. Programs that are the same, even if aired at different times, will have the same prgid 934. The type 932 contains the type or category of the program corresponding to the prgid 934.

As one skilled in the art would recognize, the fixed length program table size would be approximately 96K for 200 channels having 30 minute time slots and 24 hours of data (200 channels*10 bytes/time slot/channel*48 time slots). If the program table size was too large, the time slots could be increased, the amount of time captured for in the table could be decreased, the netref 930 could be removed so that the verification wasn't performed or other modifications that would be obvious to one of ordinary skill in the art.

A variable length program table is particularly useful when the accuracy of exactly what program is being viewed is of critical importance. The variable length program table includes a variable length program header (FIG. 10A), a variable length network header (FIG. 10B), and one or more variable length data records (FIG. 10C).

FIG. 10A illustrates an exemplary variable length program header format. As illustrated, the variable length program header format includes for each field a column for name 1000, type 1002, size 1004, flags 1006, and description 1008. The fields captured in the variable length program header include a program table version number (version) 1010, starting date and time of the program table (startdate) 1012, duration of the program table (duration) 1014, and number of networks (netcount) 1016.

FIG. 10B illustrates an exemplary variable length network header format. As illustrated, the variable length network header format includes fields for network reference number (NETREF) 1020, and number of programs for the network (count) 1022.

FIG. 10C illustrates an exemplary variable length data record format. As illustrated, the variable length data record format includes for each program a start time (start) 1030, which is expressed as difference from the startdate 1012, duration of program (duration) 1032 measured in minutes, program type (type) 1034, and a program ID (prgid) 1036.

In a variable length table, all program data for a single network is specified prior to moving on to the next network. The netidx 738 provides the location for the start of the program data for that network. The program information is then sequentially searched to locate the program time that corresponds to the event. A variable length program table provides the VCPS 290 the most exact data about the programs. Since the number of records is variable, the exact table size is unknown. As would be obvious to one of ordinary skill in the art, the data sizes of the program records can be reduced at the cost of flexibility and accuracy.

Figure 11:
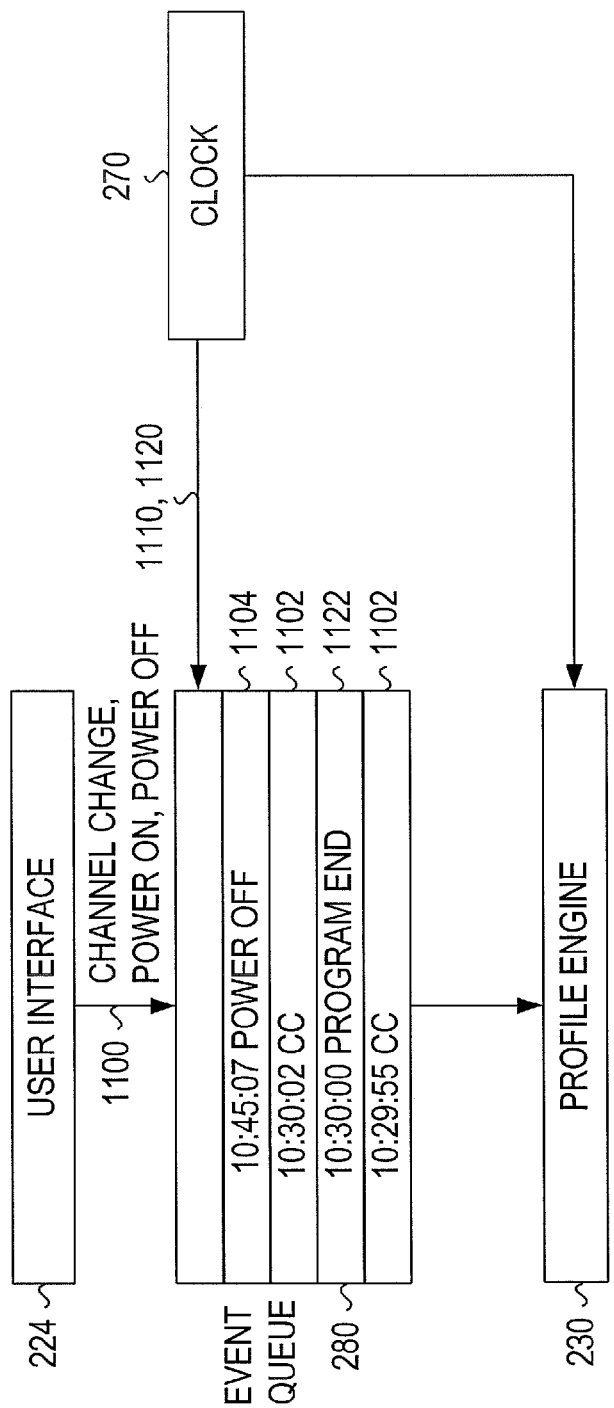
FIG. 11 illustrates an exemplary logic flow of how user interactions are captured, according to one embodiment.

FIG. 11 illustrates an exemplary logic flow of how user interactions are captured by the VCPS 290. The user interface 224 receives user interactions 1100, such as, channel changes 1102 and power on/off 1104, and forwards these interactions 1100 to the event queue 280. The event queue 280 captures these viewer interactions 1100 and time stamps them according to the time 1110 provided by the clock 270. The clock 270 is also used to initiate internal events 1120, such as, change of day part (not illustrated), and end of show 1122, and these internal events 1120 are also stored in the event queue 280. As illustrated, the event queue 280 includes four entries, each entry identifying the time 1110 and the type of event. For example, the first event was a channel change 1102 that occurred at 10:29:55. The entries from the event queue 280 and the time 1110 from the clock 270 are provided to the profile engine 230. In a preferred embodiment, the entries are taken in time order (i.e., first in, first out).

Figure 12:
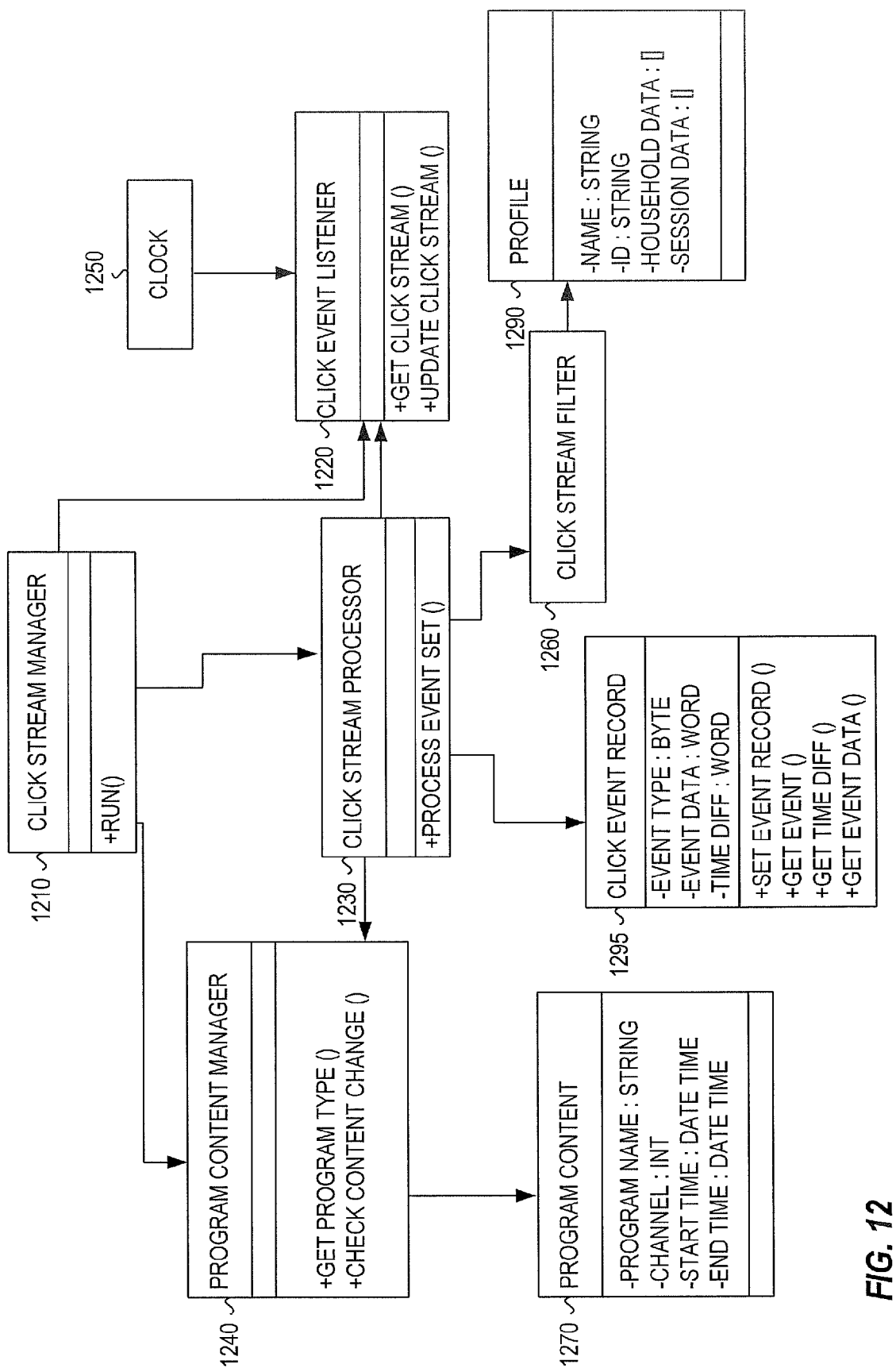
FIG. 12 illustrates an exemplary class diagram of how the click stream of a viewer is processed to generate a viewer profile, according to one embodiment.

FIG. 12 illustrates an exemplary class diagram of how the click stream of a viewer is processed to generate a viewer profile. A ClickStreamManager 1210 manages a ClickEventListener 1220, a ClickStreamProcessor 1230, and a ProgramContentManager 1240. The ClickEventListener 1220 listens for events, both internal and via the user interface, and time stamps the event with the time provided by a clock 1250. As one of ordinary skill in the art would recognize, internal events, such as change of day part, change of day, and end of program, are not related to the click stream of a viewer but may still be captured by the ClickEventListener 1220 and processed by the other components of the exemplary class diagram of FIG. 12.

The ClickStreamProcessor 1230 retrieves events from the ClickEventListener 1220 and, if applicable, requests program data for a selected program from the ProgramContentManager 1240. The ProgramContentManager 1240 retrieves the applicable program data from ProgramContent 1270. The program data includes, but is not limited to, program title, program genre, program category, and network. The ClickStreamProcessor 1230 then processes the events and, if applicable, program data utilizing ClickStreamFilters 1260 to filter events such that only the appropriate event types are used in generating profile categories.

The ClickStreamFilters 1260 direct and add data to the relevant profile category to generate or update a Profile 1290 comprising multiple profile categories. Such categories, as described further herein, include preferred networks, preferred programs, viewing duration, channel change frequency, and holding factor. The ClickStreamProcessor 1230 also generates a ClickEventRecord 1295, which is a record of events for a given session or other time period.

In one embodiment, the ClickStreamProcessor 1230 will continually poll the ClickEventListener 1220 for the next event. If no events have been triggered, the ClickStreamProcessor 1230 will sleep for a short period of time. Otherwise, the ClickStreamProcessor 1230 will handle an event and then immediately check for the next event. Event processing is based on the event time. According to this embodiment, the ClickStreamProcessor 1230 handles events, such as channel change and power on/off events, from the remote control to dynamically update a viewer's profile. Thus, the ClickStreamProcessor 1230 spends most of its time polling the ClickEventListener 1220 for new events. When an event occurs, the ClickStreamProcessor 1230 passes the ClickStreamFilters 1260 (an array of profile filters), which extract specific data for the household or viewer profile.

Referring back to FIG. 2A, the profile filters 250 are a set of components that implement an interface and provide mechanisms to profile the viewer based on viewer interaction with the television. Each event that occurs, whether viewer interaction or an internal event, is passed to each profile filter 250. Each profile filter 250 determines whether or not the event is relevant to the data the profile filter 250 is tracking. Each filter performs an aspect of profiling. For example, one filter may track average channel change frequency while another tracks preferred content.

In a preferred embodiment, profiles generated by the VCPS 290 include multiple profile categories, each category reflecting distinct relevant characteristics about a viewer's viewing preferences and habits. Examples of profile categories include, but are not limited to:
- preferred programs—measure of the amount of time a viewer(s) watch a particular program or program category;
- preferred networks—measure of the amount of time viewer(s) watch a particular network;
- viewing duration—amount of viewing time per viewing session;
- channel change frequency—average number of channel changes per time period;
- holding factor per program or program category—how much of an entire program or program category a household or individual watches; and
- surf sequence—typical order networks are visited in a surf routine.

As one of ordinary skill in the art would recognize, there are numerous other profile categories that could be included that would fall within the scope of the current invention. The current invention is in no way not limited to the categories described herein.

In order to generate a preferred programs profile, the VCPS 290 collects information (characterizations) about the programs that a viewer or household watches. The characterizations about the programs may include, but is not limited to, types, categories, genres, or some combination thereof. In a preferred embodiment, the characterizations will include genre and category for each program. The genre is a consistent high-level classification of a program (i.e., a generic set of program types or categories), such as sports, comedy, drama, etc. A category is a sub-class of the genre classification that is a more specific classification than the genre.

FIG. 13 illustrates an exemplary subset of genres 1310 and categories 1320 as defined by the VCPS 290. As illustrated, a comedy genre includes categories for movie, network series, syndicated, and TV movie. As one of ordinary skill in the art would recognize, the number and type of genres 1310, the number and type of categories 1320, and the relationship therebetween can be modified without departing from the scope of the current invention.

The program genre and categories may be defined by the VCPS 290, received from a service provider (e.g., TVData), or derived from a service provider. In a preferred embodiment, program characterizations are obtained from, for example, TVData and these characterizations are converted into genre and category. TVData provides a program type and category for each category and these characterizations are translated (e.g., mapped) into the program classifications of genre and category.

FIG. 14 illustrates an exemplary conversion of program type 1400 and program category 1410 provided by TVData converted to program genre 1420 and program category 1430 in the VCPS 290. For example, a TVData program type "SY" (syndicated) and category "comedy" maps to a VCPS genre "comedy" and type "syndicated". The TVData category is not necessarily a subset of the type. Moreover a "*" indicates a "match all" meaning that the type or category matches all categories or types respectively. The VCPS 290 types are a subset of the genre.

The VCPS 290 tracks the total number of seconds that a viewer watches particular program categories (genres). The VCPS 290 responds to all channel change and power on/off events. When a channel change occurs, the VCPS 290 records the time and network, and locates the program's characteristics from the program table. When the next channel change occurs, the VCPS 290 notes the elapsed time and stores that elapsed time in an array. Because it is possible that a program will end prior to a channel change, the VCPS 290 saves the elapsed time to the appropriate program category (genre) and then gets the program information for the program that is about to air such that when a channel change or power off event occurs the appropriate time spent on each program category will be accurate.

The VCPS 290 may also track the preferred program categories (genres) of the household by day or day part. A day part is a range of time during the day that is used by advertisers to characterize viewers. The VCPS 290 can create an event for a day part by saving elapsed time to the specific day part and generating a new event for the next day part.

Figure 15:
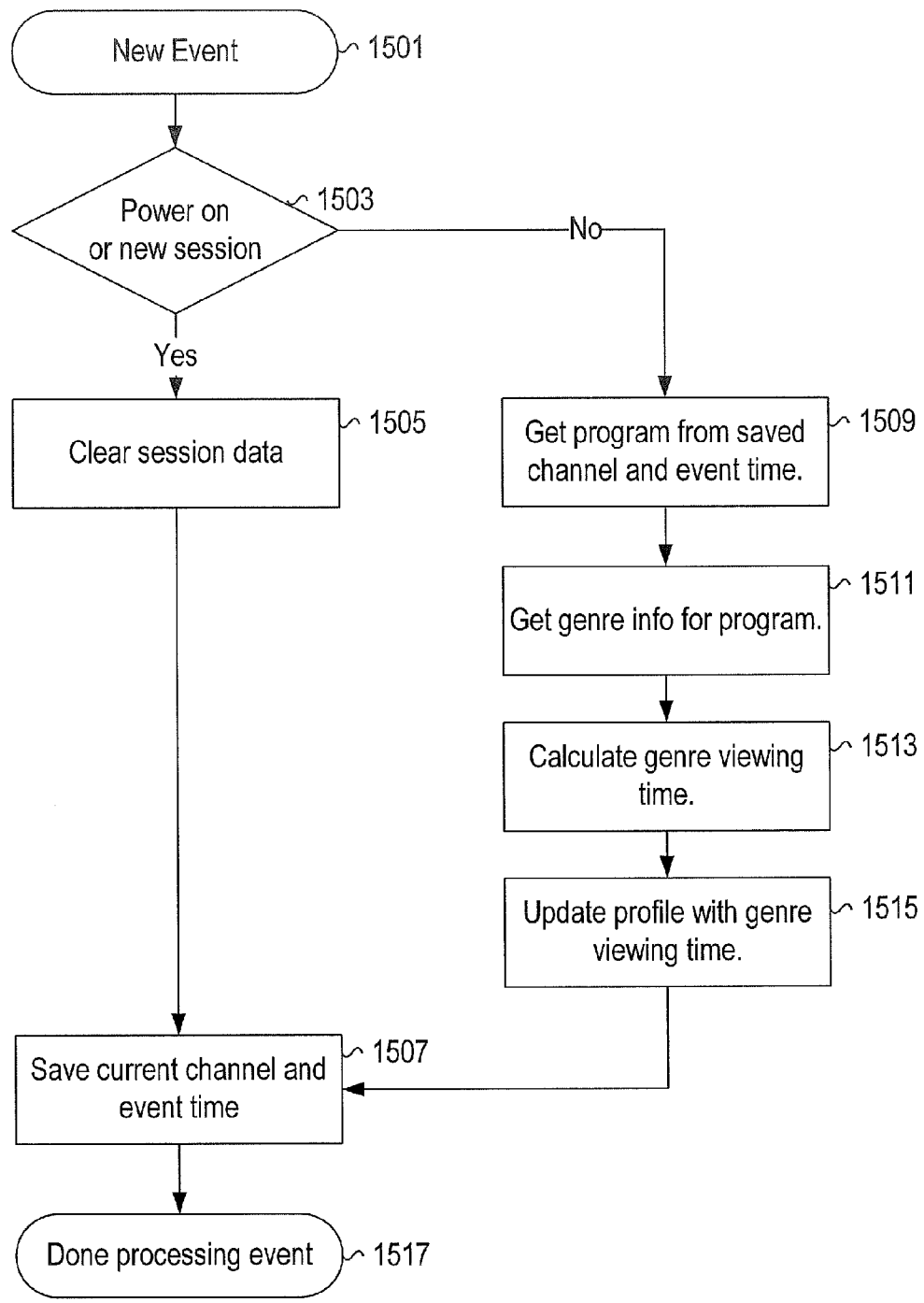
FIG. 15 illustrates an exemplary process flow of genre data, according to one embodiment.

FIG. 15 illustrates an exemplary process flow for processing genre data in order to generate a viewer profile. The process starts when a new event is detected and is passed to the genre filter at step 1501. A check is made as to whether or not the event is a power on event or a new session event at step 1503. If yes at step 1503, the current session data up to that point is cleared at step 1505, and the current channel and event time are saved (i.e., stored in memory for the new session) at step 1507. If no at step 1503, then the actual program data associated with the channel tuned to at the event time is obtained at step 1509. The genre for the particular program is then determined, utilizing the program data, at step 1511. The total genre viewing time is calculated at step 1513. The current session profile is then updated to reflect the total genre viewing time for that session at step 1515. The current channel and event time are then saved at step 1507. The processing of the event is then complete (step 1517).

Figure 16:
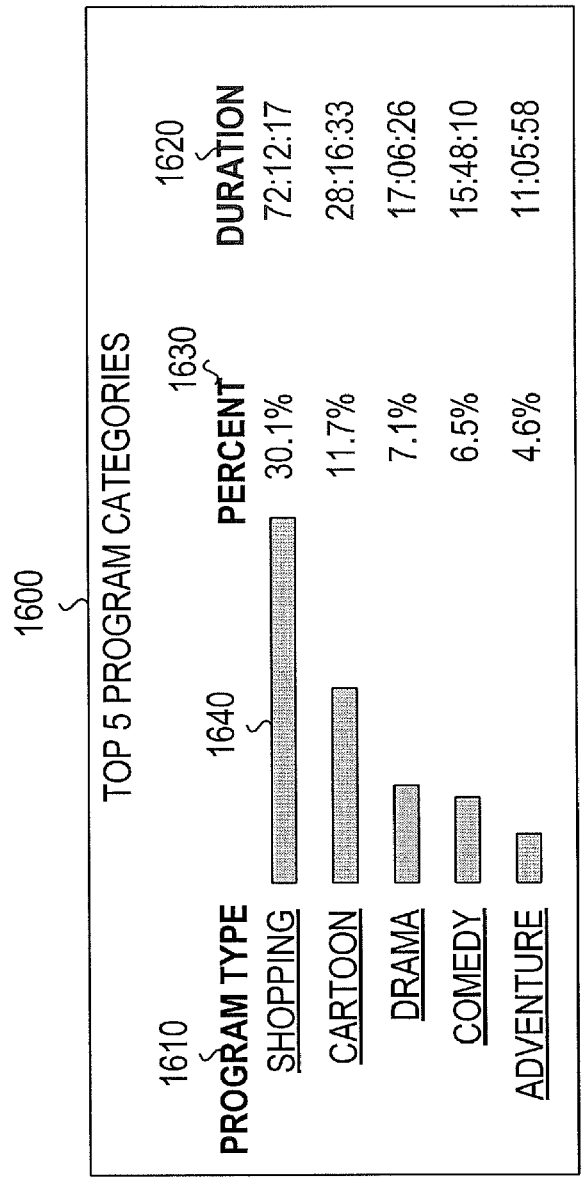
FIG. 16 illustrates an exemplary preferred program category profile, according to one embodiment.

FIG. 16 illustrates an exemplary preferred program category (genre) profile 1600, reflecting the top five program categories (genres) chosen by this viewer and the associated relative durations that those program categories were watched. The category profile 1600 includes program type (genre) 1610, duration 1620 (total time spent viewing each program type 1610 in HH:MM:SS format), percent 1630 (percentage of the total viewing time spent viewing that the particular program type) and a bar graph 1640 reflective of the percent 1630, or the duration 1620, or both for each program type 1610. As illustrated, the number one program type (genre) 1610 is shopping, which this particular viewer has viewed over 30% of the time.

Note that this example profile is an aggregated profile comprising more than a weeks worth of data. A similar session profile comprising a much smaller span of viewing time may also be obtained by the VCPS 290. As one of ordinary skill in the art would recognize, there are numerous other formats of this graph that would be well within the scope of the current invention. For example, the bar graphs 1640 could be a pie chart or the chart could be further broken out by day or day part.

Figure 17:
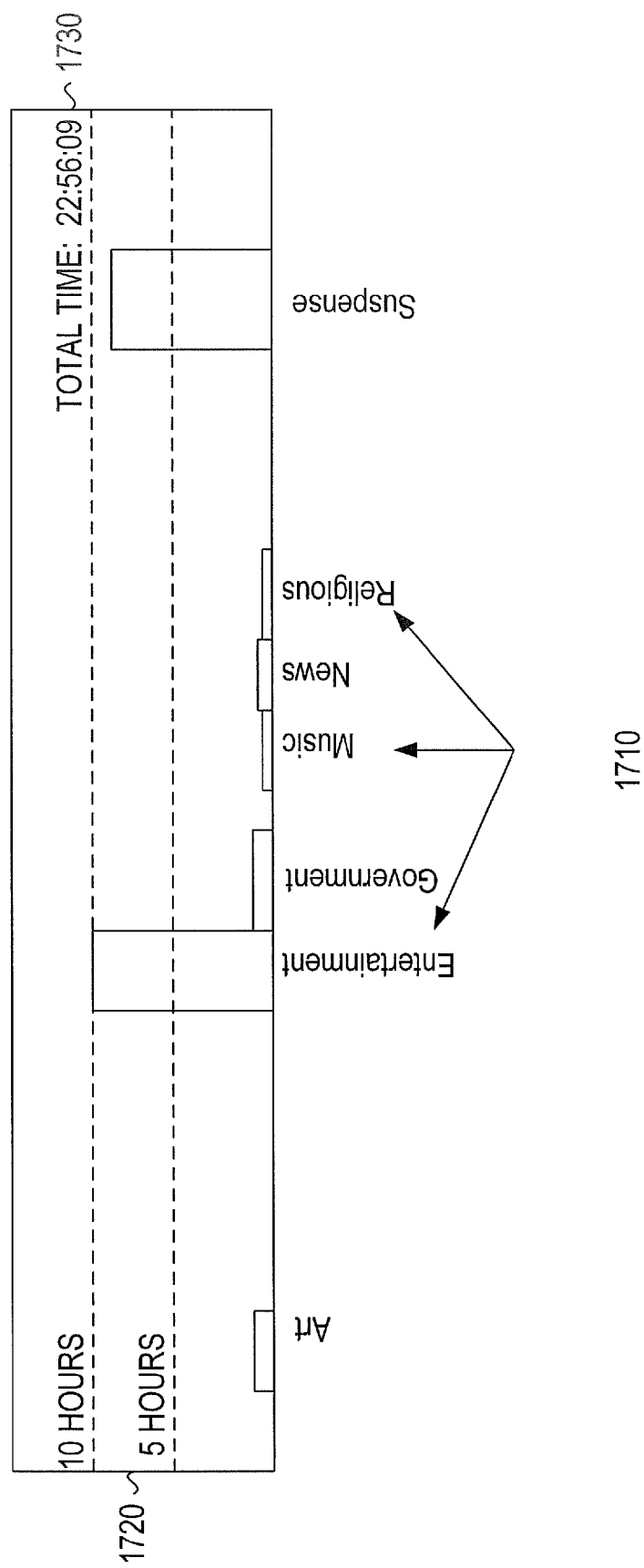
FIG. 17 illustrates an exemplary graphical representation of the genre profile of a viewer, according to one embodiment.

FIG. 17 illustrates an exemplary graphical representation of the genre profile of a viewer based on viewing time of each genre. The genres 1700 (i.e., art, entertainment) are displayed along the horizontal axis and the viewing duration (time) 1720 is displayed along the vertical axis. In the exemplary illustration, the total viewing time 1730 is identified in the upper right hand corner. As illustrated, the entertainment genre is watched the most at approximately 10 hours of the total of nearly 23 hours of programming that have been monitored. As one of ordinary skill in the art would recognize, the graph could have different styles, formats, or orientations, or could be a table or other representation, without departing from the scope of the current invention. For example, the graph could be further broken out by day or day part.

As previously discussed, program categories 1320 are more specific than genres 1310 and therefore provide for increased granularity. The VCPS 290 also tracks program categories 1320 in the same fashion as it tracks program genre 1310. An exemplary graphical representation of the program category profile is not illustrated. However, as one of ordinary skill in the art would recognize, the graph of the program category profile would be similar to the genre profile illustrated in FIG. 17 except that it would have more data points and each data point would likely account for less time. In one embodiment, all the program categories may be illustrated on one graph. In an alternative embodiment, a separate graph may be illustrated for each genre. According to one embodiment, the program category profile can be broken out by, for example, day part.

A viewer type profile estimates what type of viewer (i.e., man, woman or child) is watching a particular program. In one embodiment, the VCPS 290 uses program classifications (genre/category) and day part information to derive the estimates. FIG. 18A illustrates an exemplary table of probabilities of the viewer type based on the genre/category of programs. The table includes a genre/category column 1810 and columns associated with the probability of a viewer of a program having that genre/category being a male 1812, a female 1814 or a child 1816. As illustrated in the exemplary table, the probability of a man watching an action/movie is 40%, while the probability is 30% for woman and children.

The VCPS 290 may adjust the probability data based on the day part. For example, because the probability that a daytime viewer is a man is lower than the probability that the viewer is a woman or a child, this fact results in an adjusted and reduced probability that the daytime viewer is male. FIG. 18B illustrates an exemplary day part adjustment table, according to one embodiment. The table includes a day part column 1820 and adjustment columns for men 1822, women 1824, and children 1826. The adjustment factor is multiplied by the probability defined in the table of FIG. 18A to determine an adjusted probability. An adjustment value of 1.0 indicates that no adjustment is required, while values smaller than 1.0 will adjust the probability downwards, and values larger than 1.0 will adjust the probability upwards. For example, the adjustment factor for weekdays between 09:00-16:00 is 0.3, 0.9 and 1.0, for men, women and children respectively.

As one of ordinary skill in the art would recognize, applying the adjustment factor will likely mean that the sum of the probabilities for a particular day part will not equal 1.0. FIG. 18C illustrates an exemplary table for normalizing the probabilities. The table includes columns for viewer type 1830 (man, woman, child), for adjusted probability 1840, adjusted sum 1850, and normalized probability 1860. Using a viewer watching an action movie (respective probabilities of 0.4, 0.3 and 0.3 from FIG. 18A), during daytime hours (respective adjustments of 0.3, 0.9, 1 from FIG. 18B) the viewer has an adjusted probability of 0.12, 0.27 and 0.3 of being a man, women or child respectively (see column 1840). As illustrated, the adjusted sum 1850 is 0.69 and the normalized probabilities 1860 are 0.174, 0.391 and 0.435 respectively.

The distinction of a viewer type by gender, as described above, can be readily extended to other viewer types and demographics, and in general any set of heuristic rules or probabilities can be applied to the viewer interactivity data to generate predicted viewer traits and demographics, as will be evident to those skilled in the art. The present invention is not meant to be limited to distinguishing three viewer types as described, but could include additional sets of rules and probabilities which, in conjunction with viewer interactivity data, can be used to derive or infer viewer demographics and other attributes.

FIG. 19 illustrates an exemplary table of conditional probabilities of the likely viewer demographic makeup for different program categories (genres). The table includes different demographic groups 1910 (i.e., age, income) for different program categories 1920 (i.e., news, fiction). Each demographic group 1910 has numerous categories 1930 defined thereunder (i.e., ages 0-10, 10-18). Each cell in the table contains a conditional probability that represents the likelihood that the viewer or viewing group watching a particular category (genre) of program 1920 is within a particular category 1930 for each demographic group 1910. For example, as illustrated there is a 10% chance that a viewer watching the news will be between the ages of 0-10. As will be evident to those of ordinary skill in the art, other sets of rules and probabilities could also be utilized without departing from the scope of the present invention.

Figure 20:
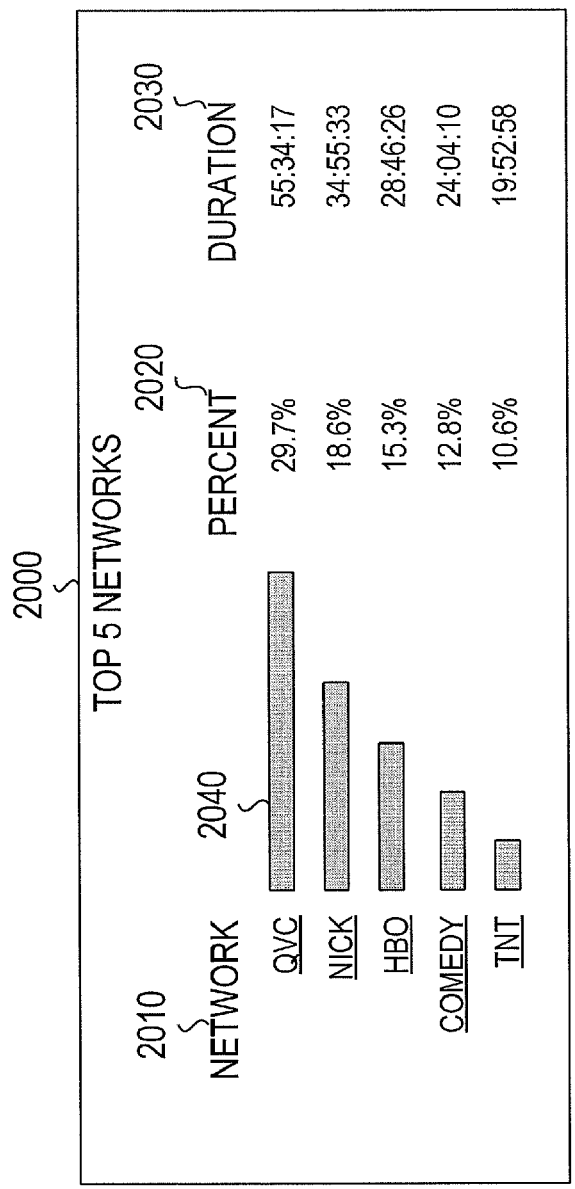
FIG. 20 illustrates an exemplary preferred networks profile, according to one embodiment.

In order to generate a preferred network profile, the VCPS 290 tracks the networks that are most watched by each viewer or household. FIG. 20 illustrates an exemplary preferred networks profile 2000, reflecting the top five networks 2010 chosen by this viewer, the associated percentage 2020 and relative duration 2030 those networks were watched. Horizontal bars 2040 also graphically illustrate the relative duration of network viewing. The VCPS 290 responds to all channel change and power on/off events. When a channel change occurs, the VCPS 290 records the time and network, and when the next channel change occurs, the VCPS 290 notes the elapsed time and stores that elapsed time in an array. The VCPS 290 may also track the preferred networks by day or day part. Note that this exemplary profile is an aggregated profile comprising more than a weeks worth of data. A similar session profile comprising a much smaller span of viewing time may also be generated by the VCPS 290.

Figures 21A, 21B:
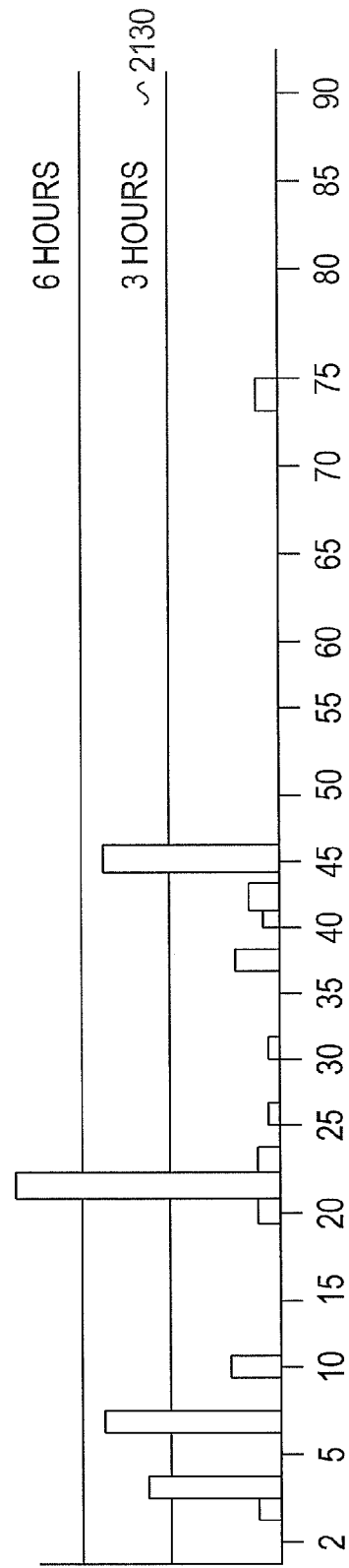
FIGS. 21A-B illustrate examples of records and graphs of network viewership by day part profile table and graph respectively, according to one embodiment.

FIG. 21A illustrates an exemplary network viewership table broken out by day part. The day parts may be associated with a single day, weekdays, weekends, or other intervals that may be appropriate. As illustrated, the breakout is for weekdays. The network viewership table includes a network column 2110 and various day part columns 2120. As illustrated, there is a total of eight-day parts having varying time durations associated therewith. The viewership duration for each day part for each network is recorded in the appropriate cell of the table. As illustrated, the time is in seconds, but could be in minutes, hours or other suitable time parameters. As one of ordinary skill in the art would recognize, the number and duration of the day parts could vary without departing from the scope of the current invention.

FIG. 21B illustrates an exemplary graphical representation of viewership by network day part. The graph displays the total time 2130 (illustrated in hours) on the vertical axis and the channels (networks) 2140 illustrated on the horizontal axis.

A viewing duration profile is the average duration of each viewing session. This is useful for determining how much television a viewer or household watches at a time (e.g., per session). This information can help identify the households that do not watch television often. To collect statistics for this profile, the VCPS 290 responds to power on/off events. The VCPS 290 tracks the elapsed time between a power on event and a power off event. The VCPS 290 also generates an average duration of each session (i.e., average viewing duration for all viewing sessions).

FIG. 22A illustrates an exemplary average viewing statistics profile 2200. The profile 2200 includes average statistics for viewing duration 2210, click frequency 2220, and the holding factor 2230. The viewing duration 2210 depicts the total amount of time (i.e., in minutes) of this particular viewing session. The click frequency 2220 depicts the frequency of channel changes during the particular viewing session. The holding factor 2230 is how much of an entire program a household watches and the average holding factor 2230 is the average of all the holding factors. No matter how many channel changes occur, the VCPS 290 will track the total time that each program is viewed.

The VCPS 290 also tracks viewing duration by day or day part. FIG. 22B illustrates an exemplary viewing duration profile by day part 2250. The profile 2250 includes the total duration 2255 (i.e., in hours) that the profile 2250 is based on, a period column 2260 and day of week columns 2270. The period column 2260 indicates the time of day, for example, as illustrated, the periods are each 4-hour periods of time (e.g., 8 pm to midnight). The days of week columns 2270, illustrate each day of the week (e.g., Monday, Tuesday, etc.). The profile 2250 tracks the viewing duration (i.e., in hours) for each period of time for each day of the week. As illustrated, the greatest viewing duration was on Friday between the hours of 8 pm and midnight (e.g., 17 hrs).

A channel change frequency profile measures how often or rapidly a viewer or household changes channels. This information can be used to determine characteristics about the household and it can help differentiate individual users within the household. FIG. 23 illustrates an exemplary channel change frequency by day part profile 2300. The channel change frequency is expressed as the average number of channel changes per time period (i.e., 30 minutes). As illustrated, the profile 2300 includes the total number of channel changes (clicks) 2310, a period column 2320, and day of week columns 2330. The number of clicks 2310 is recorded for a certain time period (e.g., one week). The period column 2320 includes time periods in which the channel changes are calculated (i.e., 4 pm to 8 pm). The day of week columns 2330 include a column for each day of the week (i.e., Monday, Tuesday, etc.). The profile 2300 tracks channel changes and calculates channel change frequency for a given day, during a given period of time. As illustrated, for Tuesday between 4 pm and 8 pm the channel change frequency calculated for that day part is illustrated as "0". To collect statistics for this profile 2300, the VCPS 290 responds to all channel change events, and collects the number of channel changes. The profile 2300 is then generated by calculating the average channel change rate for a predetermined period of time (e.g., 30 minutes).

A holding factor profile generally indicates relative interest levels in certain programs by a viewer or household. A holding factor is how much of an entire program a viewer or household watches. The VCPS 290 tracks the total time that each program is viewed. FIG. 24 illustrates an exemplary holding factor profile 2400 for an example household for specific programs. For each program title 2405, a holding factor 2420 along with the viewing duration 2415 (i.e., in seconds) and dwell time 2410 (i.e., in seconds) for a sample household is illustrated. The average holding factor takes into account the total time a particular program is watched for the entire duration of the program. For example, an hour-long program airs on channel A. Assuming a household watches channel A for 20 minutes, then changes to another channel for 10 minutes, then returns to channel A for 20 minutes, and finally turns the STB 220 off. The holding factor 1220 for the program on channel A is 40/60=66.7%. Note that in this example the holding factor is the total time spent viewing an individual program. For holding factors that are tracked by individual programs, a program reference number identifies each program. The VCPS 290 stores the program reference number in the program table. The VCPS 290 responds to power on/off events, channel change events, end of program events, and end of day part events. It is to be understood that the holding factor profile 2400 could also be applied to networks, program categories, genres, etc, and is not limited to specific program.

A channel search sequence is the order that the viewer typically visits specific networks, and this may be tracked by day part. The VCPS 290 tracks the order the networks are typically visited by averaging the visit position of each network over a series of channel surf sequences. This is quite useful for profiling and viewer identification as there may be certain channels that a particular viewer typically watches, or a specific surf sequence a particular viewer may perform.

Figures 25A, 25B, 25C, 25D:
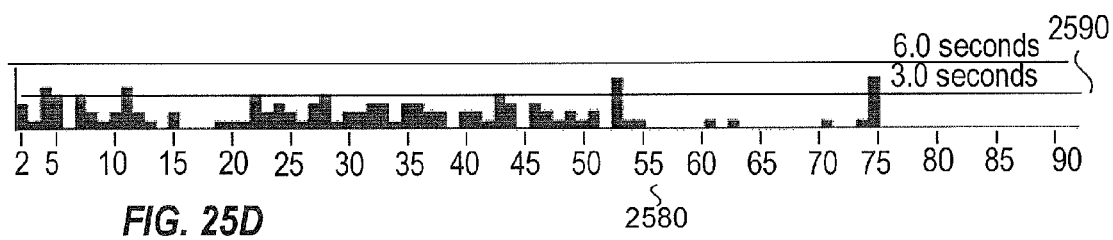
FIGS. 25A-D illustrate exemplary channel order, surf session and dwell time profiles, and a dwell time graph respectively, according to one embodiment.

FIG. 25A illustrates an exemplary table with data related to surf sequence channel order being captured and processed. The table includes a column for networks 2500, channel surf sequences 2510, 2520, 2530 and a typical search order 2540. The networks column 2500 lists networks that are desirable to track. As illustrated five networks are tracked (CNN, ESPN, HIST, TBS, TLC). The channel surf sequence columns 2510, 2520, 2530 capture the order that each network was selected during a surf sequence. For example, in the first surf sequence 2510, ESPN was the first network that was selected. The typical search order 2540 is a weighted average of all surf sequences 2510, 2520, 2530. Notice that in third surf sequence 2530, the viewer did not visit the HIST channel In this case, the typical order for the history channel relies only on the two channel surf sequences 2510, 2520 that it has data for.

Alternatively, a viewer may always sequentially search channels, such a channel range of the sequential search can help identify the viewer or an associated signature. As discussed further below, the VCPS 290 compares the session-based search order with the search order for all signatures.

FIG. 25B illustrates an exemplary table having data related to number of times each network is selected during a viewing session being captured. The table includes a network column 2500 and a surf session column 2550. The networks column 2550 lists networks desirable to track (CNN, ESPN, LIFE, TBS, TNT, USA are illustrated). The surf session column 2550 lists how many times a particular network was selected in a viewing session. As illustrated, ESPN was selected in 3 surf sequences and USA was not selected. Many networks typically carry certain genres of programs, such as sports, drama, comedy, talk illustrates, etc. for a specific day part. Because viewers have varying preferences for certain types of programs, particular viewers will look for specific programs on certain networks based on the time of day and day of week. Different viewers also have certain differing dislikes and each viewer may avoid surfing disliked networks entirely. The VCPS 290 monitors the networks visited during channel surfing for the current day part and compares the data to signatures to see if there is similar data.

The VCPS 290 keeps track of two arrays, one for the number of times the viewer visits a network (count 2560) while surfing and the other to determine the total dwell time 2570 on that network while surfing. This data can also be tracked by day part. The VCPS 290 also calculates the average channel dwell time, which is calculated by dividing the data in the total time array by the data in the total count array. The result indicates the amount of time that a viewer watched each particular network during a channel surf sequence. This result can be used to determine whether the program on that network is of interest or potentially of interest (i.e., the viewer spent time determining if they were interested) or not (i.e., the viewer was simply surfing past the channel). Viewers will typically have a higher average dwell time on networks that carry programs of interest to the viewer. FIG. 25C illustrates an exemplary table capturing dwell time 2570 and surf count 2560.

FIG. 25D illustrates a graph of the average channel dwell time for all networks in a given session. The networks are represented by the channel number on the horizontal axis 2580. The dwell time is represented along the vertical axis 2590 (i.e., in seconds). In addition to networks having different average dwell times based on viewer interest levels, the overall average dwell time can vary and be characteristic of particular viewers (indicate demographic or psychographic traits). For instance, shorter dwell times may indicate these viewers may be able to discern content faster than others and thus be associated with higher intelligence and relative income. A Fast Fourier Transform (FFT) may also be used to analyze the sequence of channel changes to extract frequency information.

A method will now be described for profiling viewers on a session-by-session basis and for differentiating viewers in a household of multiple viewers. When the identity (or profile) of a specific viewer or viewers that are watching during any given session can be identified and distinguished from other potential viewers (or profiles), targeted and custom content, including ads, can be delivered to those viewers. Such targeting will be much more efficient and accurate than if the targeting was based solely on household demographics or on a household profile. In a preferred embodiment, the viewer profiling and identification is accomplished by monitoring and processing channel change data, but it could also be accomplished by processing other forms of viewer interactivity including volume adjustments, EPG activity, etc. Moreover, the algorithms and methods described herein are exemplary methods and implementations and are by no means the only possible mechanisms or implementations of the present invention.

The VCPS 290 uses the concept of a viewing session to identify and profile individual viewers and households. In a preferred embodiment, a viewing session is a period of time during which the viewers do not change (i.e., those viewers watching at the start of the session are the same viewers watching at the end of the session). The VCPS 290 identifies the different viewing sessions and the individuals (and their associated profiles) involved in those sessions. Although viewing sessions can be determined and delimited by a viewer's self-identification (e.g., via a viewer specific remote, viewer login or custom menu usage), in the preferred embodiment, automatic detection of viewing sessions and associated viewer or viewers is employed. An exemplary embodiment of automatic detection is now described, but it is to be understood, as will be evident to those skilled in the art that the invention is not limited to the exemplary embodiment described, but could be implemented in a variety of ways.

Figure 26:
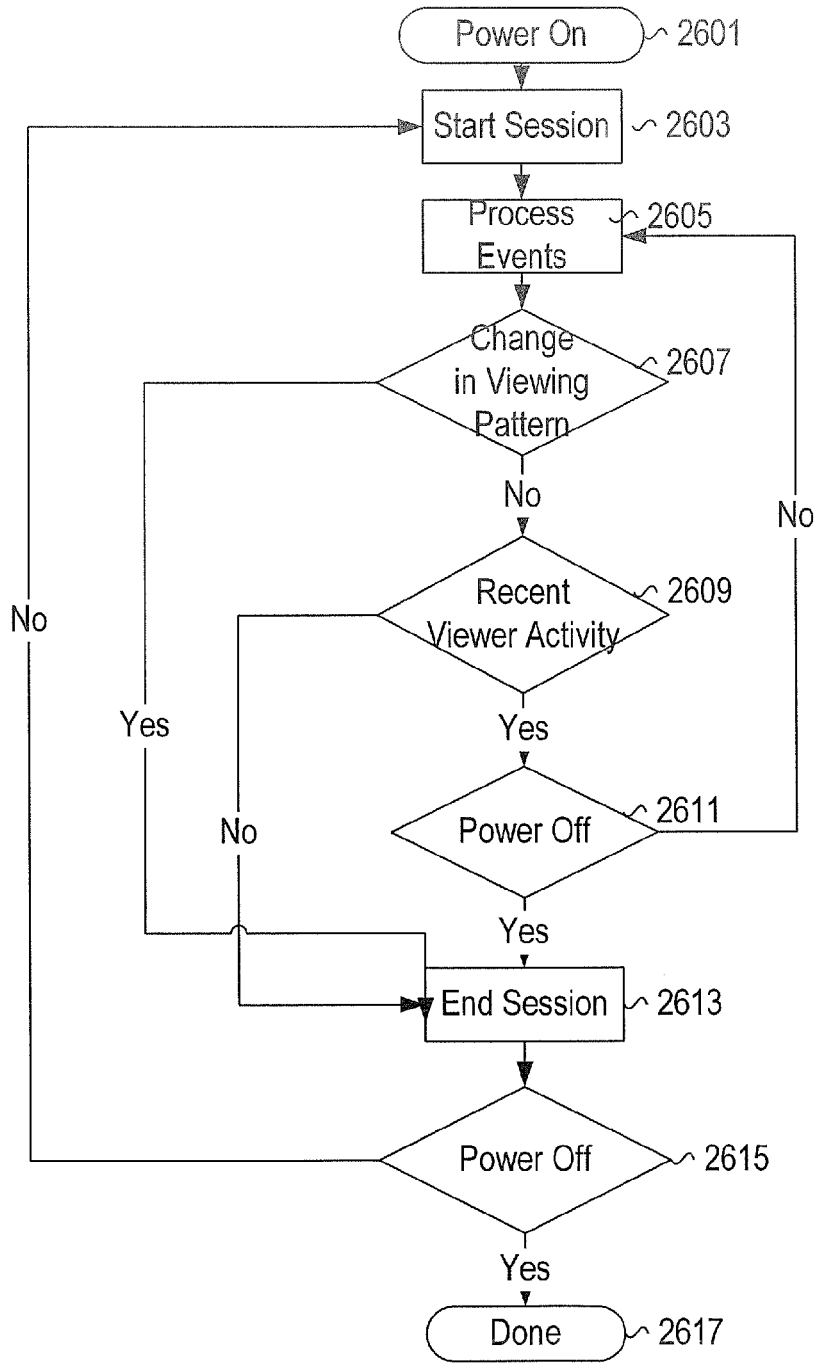
FIG. 26 illustrates an exemplary process flow chart illustrating how sessions are automatically initiated and terminated and new sessions detected, according to one embodiment.

FIG. 26 illustrates an exemplary process flow chart illustrating how sessions are automatically initiated, terminated and new sessions detected, according to one embodiment. The power is turned on at step 2601 resulting in the start of a new session at step 2603. Any events for that session are processed at step 2605. A determination is made if there is a change in viewing pattern at step 2607 (discussed in more detail later). If there was a change at step 2607, the session is ended at step 2613. If there was no change at step 2607, a determination is made as to whether there has been recent viewer activity at step 2609. If there was no activity at step 2609, the session ends at step 2613. If there was activity at step 2609, a determination is made as to whether the power was turned off at step 2611. If the power was not turned off, the next event is processed at step 2605. If the power is turned off at step 2611, the current session is ended at step 2613. If the power is turned off at the end of the session at step 2615, the session detection process ends at step 2617 (i.e., until the next power on event). Otherwise, a new session is started at step 2603.

Figure 27A:
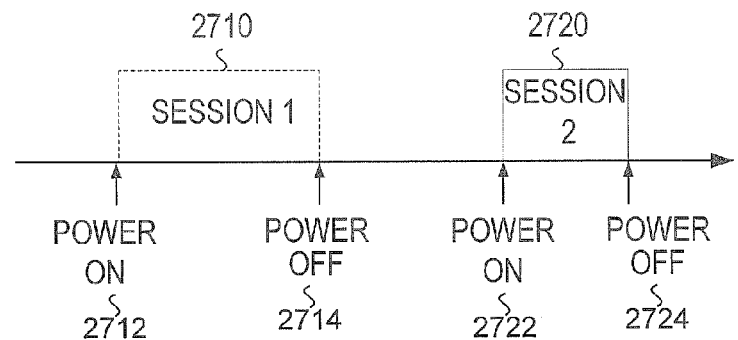
FIGS. 27A-B illustrate examples of how the time span of a viewing session can be determined and delimited, according to one embodiment.

FIG. 27A illustrates viewing sessions being determined based on when the STB 220 is powered on or off A first session 2710 starts when the STB 220 is turned on 2712 and terminates when it is turned off 2714. A second session 2720 begins the next time the STB 220 is powered on 2722 and ends at the next power off event 2724.

Figure 27B:
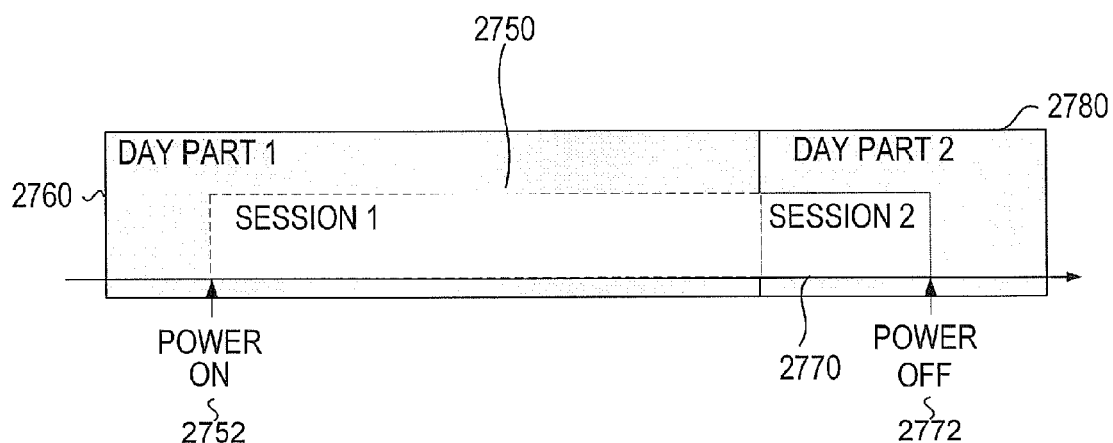

FIG. 27B illustrates sessions being defined based on fixed length windows of time. As illustrated, a first session 2750 starts when the STB 220 is powered on 2752. The first session 2750 extends for a fixed amount of time, such as the length of the average program or until the end of the current day part (illustrated as a first day part 2760). A second session 2770, is then initiated at the start of a second day part 2780. The second session 2770 continues until it is terminated at the next power off event 2772. Alternatively, the session could have continued until the end of the second day part 2780. This method improves on the simple power on/off session definition described above as it handles STBs 220 that are left on for long periods of time. Also, because viewers change frequently at the transition point between day parts, this method handles the transition of one viewer to another.

Figure 28A:
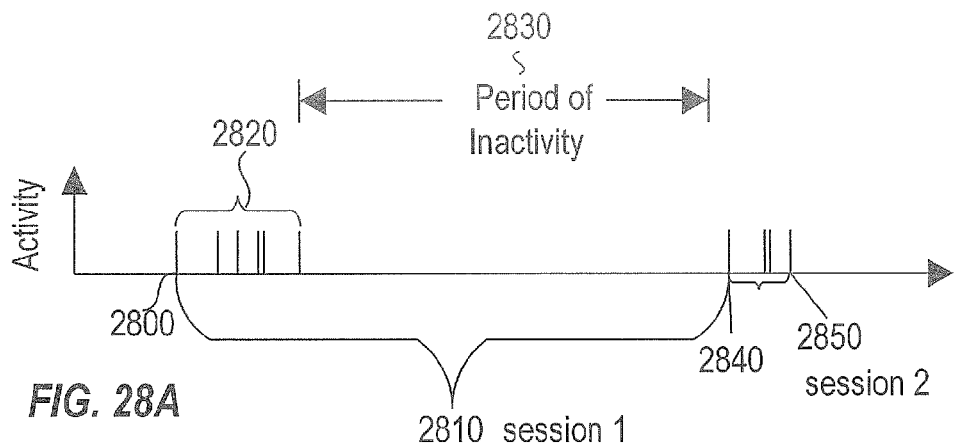
FIGS. 28A-C illustrate examples of how viewing sessions can be defined based on viewer activity or inactivity, according to one embodiment.
Figure 28B:
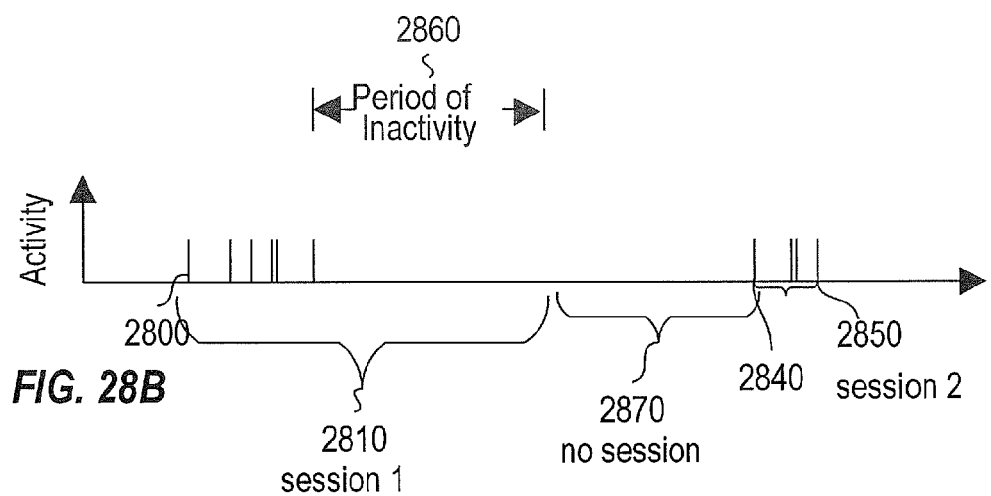
Figure 28C:
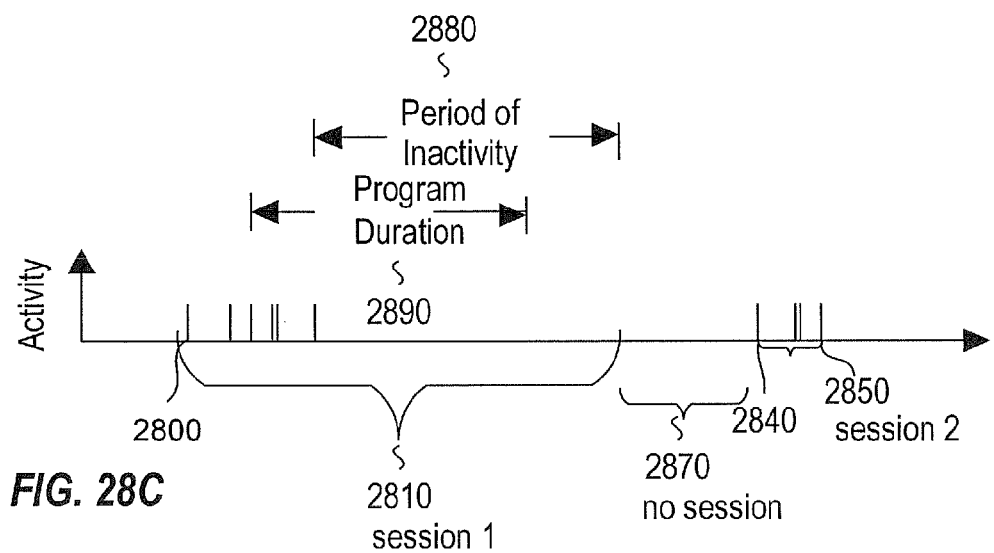

FIGS. 28A-C illustrate how viewing sessions can be defined based on viewer activity or inactivity, and how session start and end points can be based on remote control activity or inactivity. In FIG. 28A, the initiation of remote activity 2800, such as channel surfing, marks the start of a first session 2810, and occasional remote activities 2820 keep the session alive. However, if the remote control is idle for an extended period of time (period of inactivity) 2830, the VCPS 290 considers the next activity from the remote control 2840 to be indicative of the start of a second session 2850. The period of inactivity 2830 used to determine a new session can vary widely depending on the application and may be dynamically configurable.

FIG. 28B illustrates a case where the VCPS 290 immediately terminates the first session 2810, after a period of inactivity of a defined time 2860. The second session 2850 does not begin until activity 2840 resumes. Viewers are not considered to be watching television during the period of inactivity after the session ends, and therefore there is no session 2870. The period of inactivity 2860 can be specified as a fixed amount of time or a varying amount of time based on day, day part, network, etc.

FIG. 28C illustrates an example of how the first session 2810 is ended based on a period of inactivity 2880, but only after a program currently being viewed has ended 2890. This method has the advantage that even though extended periods of inactivity occur, a viewer may be simply watching a particular program for an extended period of time and thus the session should cover these periods. As illustrated, this embodiment shortened the period associated with no session 2870 since the first session 2810 did not end until some time after (period of inactivity 2880) the end of the current program 2890. As one skilled in the art would recognize there are numerous methods for utilizing the period of interactivity 2880 in conjunction with the end of program 2890 that are well within the scope of the current invention. For example, the period of inactivity 2880 may be defined as a time, such as 60 minutes or the end of a program 2890, whichever is greater. Alternatively, the period of inactivity 2880 may be defined as 60 minutes or 30 minutes after the end of the program 2890, whichever is greater. Alternatively, the period of inactivity 2880 may be a total of 60 minutes or 30 minutes of inactivity after the end of a program 2890, whichever is less (as long as the program was over prior to 60 minutes of inactivity).

Viewing sessions can also be defined based on the content accessed by the viewer and the interactivity behavior of the viewer. Examples of such interactivity behavior include but are not limited to, the rate of channel change, program type preferences, preferred networks, and program search patterns. The interactivity behaviors could vary by day part. Using the concept of a sliding window, viewer behavior changes, such as increased channel change frequency, and viewer preference changes, such as changes in programs or networks, can be detected and used to terminate a current session, initiate a new session, or both. A determination as to whether to start a new session based on the change of preferred networks can be made based on predetermined rules regarding the networks (e.g., different networks attract viewers with differing demographic attributes), or could be based on previously stored session information and profiles and/or signature profiles (discussed further herein).

Figure 29:
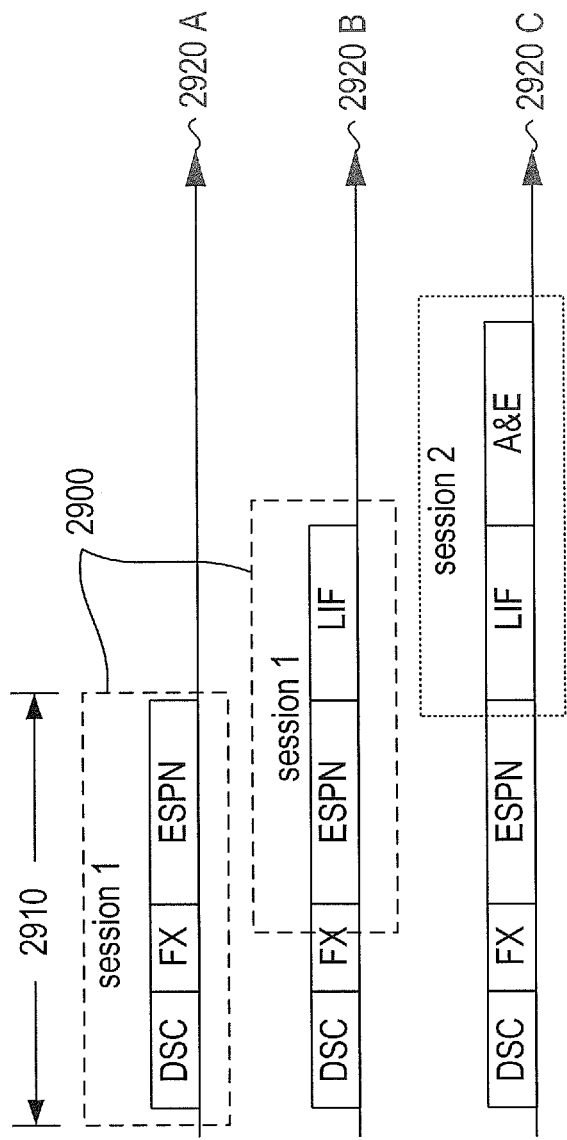
FIG. 29 illustrates a sliding window is used to identify session termination and initiation points, according to one embodiment.

FIG. 29 illustrates the concept of a sliding window identifying session termination and initiation points. A sliding window 2900 is a window of specific duration 2910, which is continually translated forward in time along a time axis 2920.

As the sliding window 2900 moves along the time axis 2920, data, such as preferred networks, within the sliding window 2900 are monitored and compared with the same data for an overall session up to that point in time. Utilizing this comparison, the VCPS 290 can determine whether or not the viewership has changed based on how well the data (e.g., preferred networks) in the sliding window 2900 compares with similar data for the entire session. When the viewing behavior within the sliding window 2900 is sufficiently different from the overall session behavior, the VCPS 290 considers the data within the sliding window 2900 as part of a new session As illustrated on a first time axis 2920A, the sliding window 2900 includes networks DSC, ESPN, and FX. These networks are considered to be identifiable with a single viewer and thus are identified as session 1. As time progresses to time axis 2920B, the sliding window 2900 includes networks FX, ESPN and Lifetime. These changes in networks are not yet enough to trigger a change in session. However, as time progresses to time axis 2920C and the sliding window 2900 includes mostly networks Lifetime and A&E, the VCPS 290 initiates session 2. The determination as to whether to start a new session based on the change of preferred networks can be made based on predetermined rules regarding the networks (e.g., different networks attract viewers with differing demographic attributes), or could be based on previously stored session information and profiles and/or signature profiles (discussed further herein).

This method of automatic session detection and transition is extremely powerful as it is driven by viewer habit and preferences, and occurs in real-time. Although in this example the preferred networks are monitored by the sliding window it is to be understood, as will be evident to those skilled in the art, that other classes of viewer interactivity and preferences or combinations of classes (weighted or non-weighted) could also be used with the sliding window method to identify session transition. These other classes may include, but not limited to, preferred program genre, networks, surf patterns, program categories, viewer type (i.e., male, female, child), volume adjustments, and EPG activity.

Figure 30:
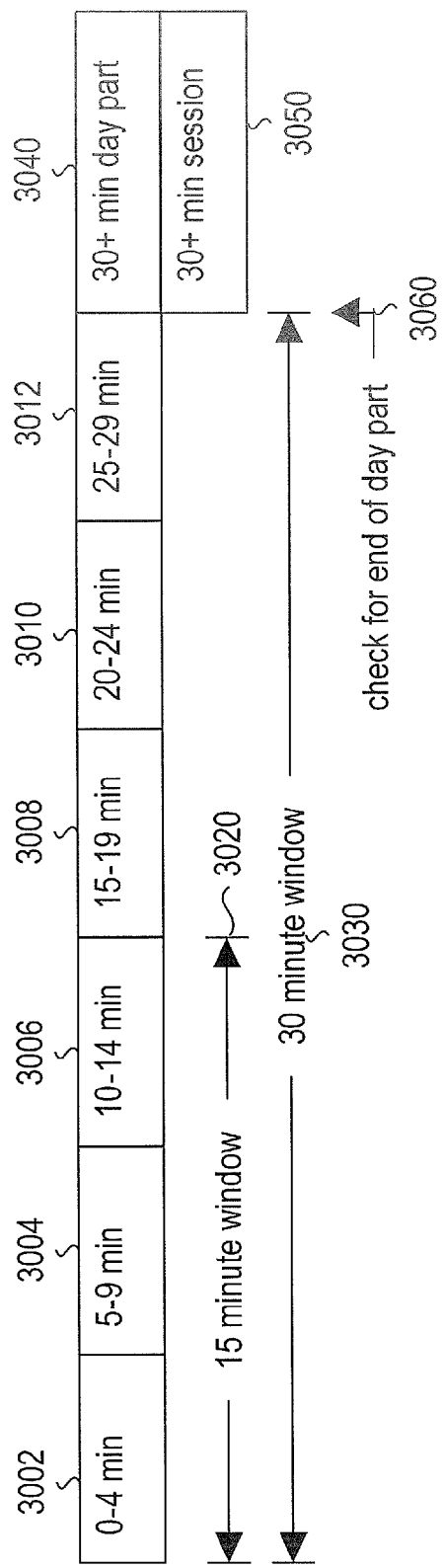
FIG. 30 illustrates sliding windows and their associated data sub-sessions, according to one embodiment.

In a preferred embodiment, the VCPS 290 uses two sliding windows, a small window to detect radical changes in viewer behavior and a larger window to detect more subtle changes. FIG. 30 illustrates implementing sliding windows by collecting data into fixed-width data bins termed sub-sessions. Each sub-session represents a unit of time during which viewer interactivity is monitored. A window consists of a fixed number of the sub-sessions, starting with the most recent. As the amount of time represented by a single sub-session elapses, the window slides so that it always incorporates the most recent set of sub-sessions. According to one embodiment, the VCPS 290 uses six 5-minute sub-sessions 3002-3012 with two sliding windows, one of 15 minutes 3020 (3 sub-sessions) and one of 30 minutes 3030 (6 sub-sessions).

The fifteen-minute window 3020 has a high threshold of viewer behavioral change as it is meant to detect radical changes in the viewing behavior in a short period of time. The thirty-minute window 3030 detects more subtle changes in behavior and has a lower threshold for change detection. Each sub-session is labeled with a range of minutes, which indicates the amount of time that has elapsed since session began. Two additional sub-sessions, represent data that is outside the windows 3020, 3030 (events that occurred 30+ minutes ago). One sub-session stores events that occurred over 30 minutes ago for the current day part 3040. The other sub-session stores data that occurred over 30 minutes ago for this session 3050.

As events occur, the data is stored in the 0-4 minute sub-session 3002. After 5 minutes has elapsed, the data for all sub-sessions except the 30+ minute sub-sessions 3040, 3050 is shifted to an adjacent bin (as illustrated, shifted to the right). Data coming out of the 25-29 minute bin 3012 is added to both the 30+ minute day-part bin 3040 and the 30+ minute session bin 3050. The 0-4 minute sub-session 3002 is cleared. The 15-minute sliding window 3020 encompasses the first three sub-sessions 3002-3006 while the 30-minute sliding window 3030 encompasses the first six sub-sessions 3002-3012.

In addition to collecting session data in order to generate a session profile, which is limited to a viewing session and which is collected over a relatively short period of time, the VCPS 290 generates and updates a more complete profile of the user by combining current session data with historical data for this viewer. This aggregated viewer or household historical data is referred to as a signature. A signature can best be described as the aggregation of session data for a particular type of viewer or household over an extended (multiple sessions) period of time. A single signature does not necessarily correspond to a single unique viewer in a household. The combination of multiple members of a household watching television simultaneously may result in a household signature, different than any of the individual signatures.

Also, members of the household with similar viewing habits may be aggregated into a single signature. It is also possible that different viewing habits for a single member of the household can result in multiple signatures for that member. The VCPS 290 stores multiple signatures, in order to account for multiple viewers and subsets of those viewers within a household, each signature representing at least a subset of different viewing characteristics. In a preferred embodiment, the VCPS 290 stores up to fifteen unique signatures per household, and each signature may correspond to a particular viewer, a group of particular viewers, or to the entire household of viewers, and the VCPS 290 retains the signature information in long-term storage (e.g., on a hard drive or in non-volatile memory).

In a preferred embodiment, the VCPS 290 generates and stores viewer and household signature profiles based on one or more session profiles. When the VCPS 290 is first initiated, and there are no session or signature profiles, the VCPS 290 generates the first signature profiles from the first session profiles. Then, as the VCPS 290 monitors and processes data from subsequent viewing sessions, it will continually attempt to correlate the session data with a specific signature, and associate the long term viewing habits and other interactivity of a particular viewer or household with short term viewing habits and interactivity. In an alternative embodiment, signatures may be loaded into the STB 220 externally (either when the unit is manufactured, purchaser, or installed or during use). The loaded signatures may represent characteristics that advertisers are looking for, be standard signatures that identify distinct market segments, be representative signatures for a particular area, or other representations that would still be within the scope of the current invention. The preloaded signatures may be updated to take into account session profiles that are deemed to correlate with the signature profiles or may stay the same until updated by the network operator or other responsible party.

In a preferred embodiment, the signature profile comprises the same profile categories as the session profile allowing for a direct correlation between categories. The VCPS 290 writes session data to the signature history at the end of day parts and sessions. Each 5-minute sub-session tracks the day part that it resides in, and the 30-minute day-part sub-session 3040 does the same. When data is being added from the 25-29 minute sub-session 3012 into the 30+ minute day-part sub-session 3040, the VCPS 290 verifies that the sub-sessions are the same day part 3060. If the sub-sessions are for a different day part, the data from the 30+ minute day-part bin 3040 is written to the signature data that best matches the current session and the 30+ minute day-part bin 3040 is cleared.

Because the VCPS 290 tracks all of the session data and also must write day part data to the signatures, the 30+ minute session sub-session 3050 stores all data for the current session that is outside the sliding windows. This data is used for comparing changes in session behavior. When a session terminates due to behavior change, data within the sliding window represents a new session while data outside that window is the old session.

If the 30 minute window 3030 detected the change in session, the 30+ minute day-part sub-session 3040 is written to the signature file and the 30+ minute day part bin 3040 and 30+ minute session bin 3050 are cleared. Note, the 30+ minute session bin 3050 is not required to be written to the signature file as the 30+ minute day part bin 3040 is written to the signature file, and all previous day parts that were part of this session were previously written to the signature file.

If the 15-minute sliding window 3020 detected the behavior change, then data in the 5-minute sub-sessions outside the 15-minute sliding window 3020 (last 3 five-minute sub-sessions 3008-3012) are also written to the signature file and cleared. When a session terminates due to power off or lack of user interaction, all data in the 5-minute sub-sessions 3002-3012 and the 30+ minute day-part sub-session 3040 are written to the signature file and cleared.

Figure 31A:
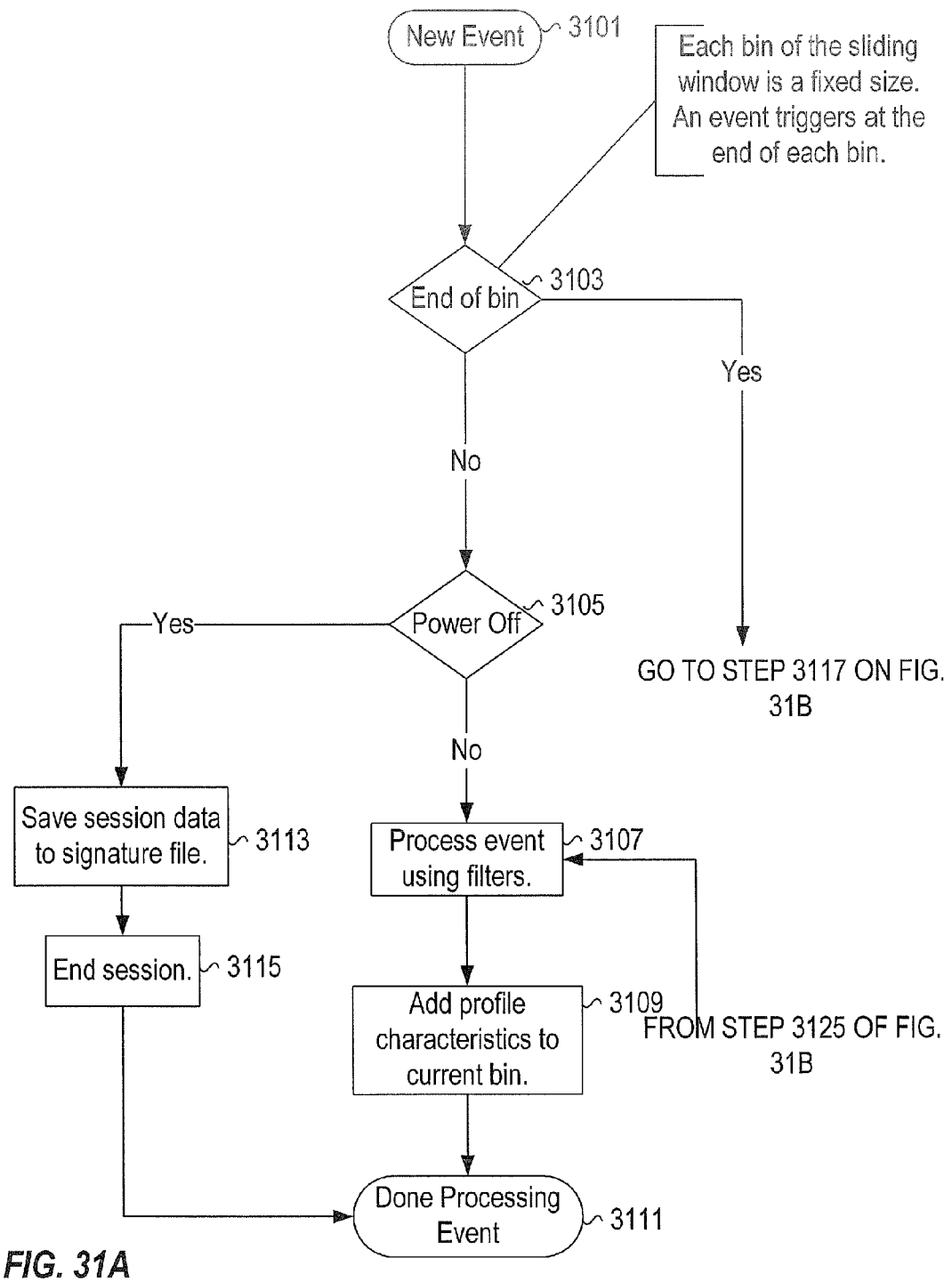
FIGS. 31A-B illustrate how session data is compared with the signature data already stored on the VCPS, according to one embodiment.
Figure 31B:
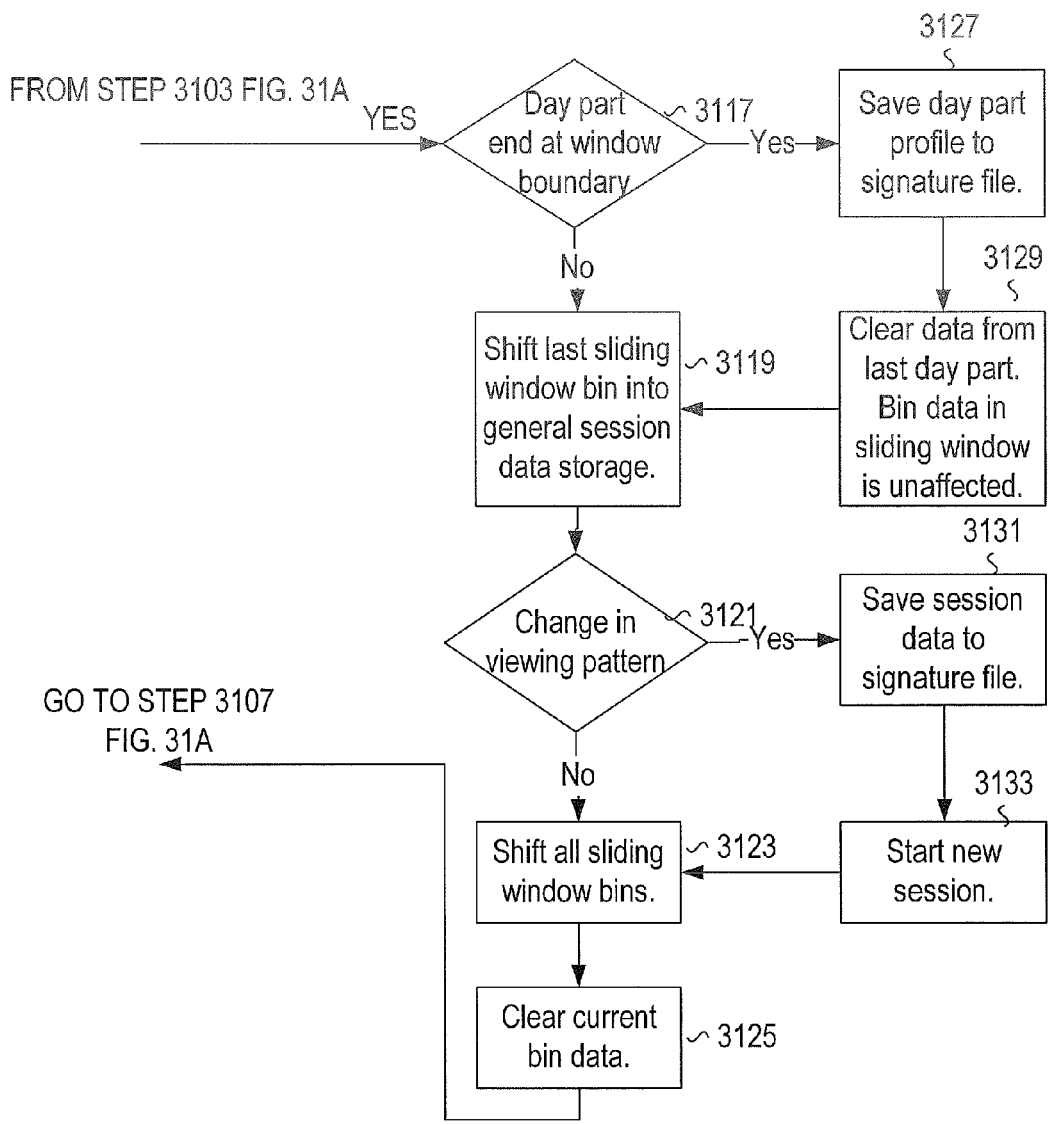

FIGS. 31A and 31B illustrate an exemplary process flow of how the sliding windows are managed and events are associated with sessions according to one embodiment. A new event occurs at step 3101. A determination is made as to whether it is the end of a bin (i.e., 5 minutes of data saved in current bin) at step 3103. The new event will be with the current sub-session (bin) until the end of the sub-session (bin). If the current sub-session is still active, a determination is made as to whether the power is turned off at step 3105. If the determination of step 3105 is yes, the data collected for the current sub-session will be saved to a signature file at step 3113 and the session ends at step 3115. Otherwise, the event will be processed using the filters at step 3107 and the profile characteristics derived will be added to the current sub-session at step 3109. The processing of the event is complete at step 3111.

If the new event occurs at the end of a sub-session at step 3103, then a check is made as to whether the leading edge of the sliding window coincides with the end of a day part at step 3117. If they do not coincide, then the last sliding window sub-session is shifted into the 30+ minute session bin at step 3119. If they do coincide, then the day part profile is saved to a signature file at step 3127, the data is cleared from the 30+ minute day part bin at step 3129, and then the last sliding window sub-session is shifted into 30+ minute session bin at step 3119.

At step 3121, a determination is made as to whether there was any change in viewing pattern. If there was no change, all sliding window sub-sessions are shifted at step 3123 and the current bin is cleared at step 3125. The data from the ending sub-session is then processed via the filters at step 3107 and added to the profile for that sub-session at step 3109. If a change in viewing pattern is detected, then the session data is saved to a signature file at step 3131 and a new session is started at step 3133. All sliding window bins are then shifted at step 3133.

As one of ordinary skill in the art would recognize, there are numerous methods for performing the determination of step 3121 that are well within the scope of the current invention. For example, the determination can be made by comparing the current viewing characteristics with the session profile, or, if applicable, with the signature profile associated with the session profile. The current viewing characteristics may be defined as a single element of time or may be multiple elements of time for purposes of comparison. The embodiment described above used two periods of time (last 15 minutes and last 30 minutes) for the current viewing characteristics. It should be noted that the current invention is not limited to these time frames. According to one embodiment, these time frames would be an adaptable parameter of the system.

If multiple time frames are used the thresholds for determining a change in viewership would be different. As described above, the shorter window of time would be used to detect radical changes while the longer window of time would be used to detect more subtle changes. The comparisons may be based on one or more viewing characteristics. If multiple viewing characteristics are used in the comparison, the different characteristics may have different weighting factors applied. If multiple windows of time are used, the same elements may be compared, the same element with different weighting factors may be compared, or different element may be compared.

Figure 32A:
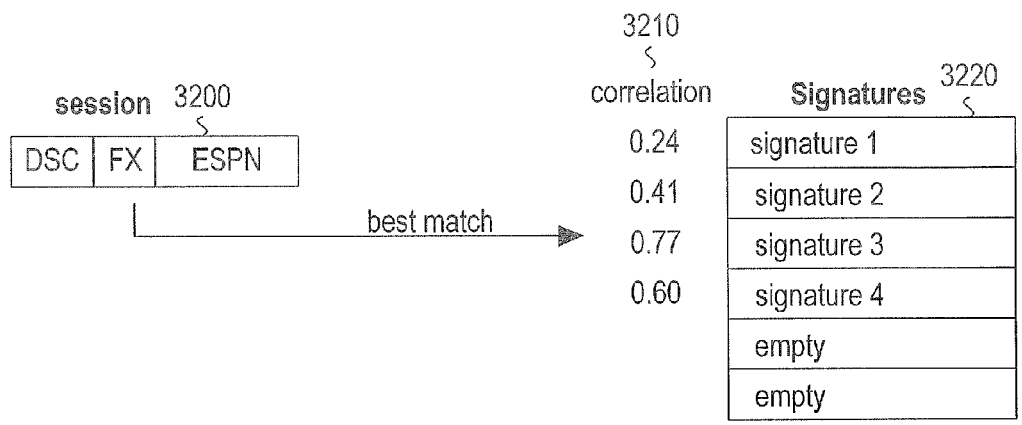
FIGS. 32A-B illustrate an exemplary process flow chart of how events are processed and associated with a particular session, and how the sliding window is managed, according to one embodiment.
Figure 32B:
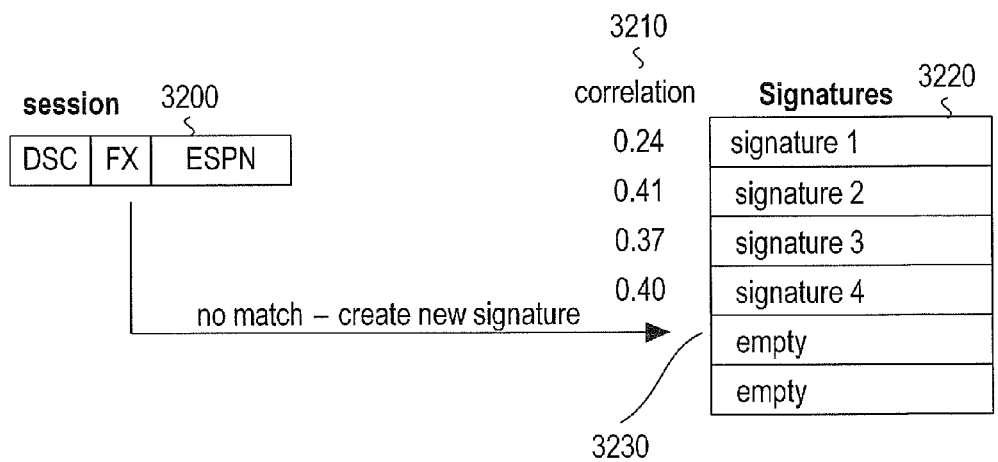

FIGS. 32A and 32B illustrate how session data is compared with the signature data already stored in the VCPS 290. As data is collected about a session, the VCPS 290 continually calculates (in real or near-real time) the session profile and compares that to existing signature profiles. FIG. 32A illustrates a session profile 3200 and correlation factors 3210 for existing signature profiles 3220. As illustrated, the session profile 3200 has the best correlation with signature 4 (77%). This iterative process continues until the session terminates. According to one embodiment, the VCPS 290 compares the current session data against the signature data every five minutes to find the signature that correlates best with the session. The "best" signature match may change several times while session data is being collected. This is to be expected since the accuracy of the data increases as the amount of viewing data increases. It should be noted that although the session profile is illustrated as tracking networks, it is to be understood that the actual correlation of a session to a signature may entail correlating various category profiles, combinations of category profiles, or weighted combinations of category profiles. According to one embodiment, the correlation factors are adaptable. It would be within the scope of the current invention for the user, the network operator or other parties to adapt these parameters.

When the viewing session terminates, the current session profile 3200 is added to the signature profile 3220 that had the best correlation 3210. The VCPS 290 performs a weighted average between the session profile 3200 and the signature profile 3220 so that the data is properly scaled based on overall viewing time. Thus, the signature profiles 3220 that represent long periods of viewing history will only be slightly altered by new viewing data. In addition to adding the session profile 3200 to the associated (highest correlation above threshold) signature profile 3220 at the end of the session, the VCPS 290 may also add the current session profile 3200 to the associated signature profile 3220 at the end of day parts, the end of programs, end of days or defined time periods.

FIG. 32B illustrates a case where the session profile 3200 does not correlate with any of the existing signature profiles 3220 (none of the correlation meet a minimum correlation threshold). Therefore, the session profile 3200 is used to create a new signature profile 3220 that is stored in one of the empty signature bins 3230.

According to one embodiment, once a matching signature has been established, a fully populated 15-minute sliding window 3020 (all three 5 minute bins 3002-3006 are filled) is used to determine viewer behavior changes. The VCPS 290 compares the data in the 15-minute sliding window 3020 against the signature data. The data within the 15-minute sliding window 3020 must differ significantly (e.g., exceed a difference threshold or not meet a correlation threshold) from the signature data for the VCPS 290 to terminate the session. As would be obvious to one of ordinary skill in the art, reducing the difference threshold (or increasing the correlation threshold) would likely result in earlier termination of sessions, and increasing the difference threshold (or decreasing the correlation threshold) would likely result in longer sessions.

In another embodiment, once the matching signature profile has been identified the VCPS 290 may also use a fully populated 30-minute sliding window 3030 to determine viewer changes. As the 30-minute sliding window 3030 is designed to detect more subtle changes, the difference threshold is accordingly lower (or correlation threshold is accordingly higher) than for the 15-minute sliding window 3020. If the 30-minute sliding window 3030 and the signature exceed the difference threshold (or fall below the correlation threshold) the session is terminated. In an alternative embodiment, the 30-minute sliding window 3030 is next compared to the overall session before a termination decision is made. If this difference threshold is also exceeded (or falls below the correlation threshold) the session is terminated. The difference (or correlation) thresholds for both the 30-minute sliding window-vs.-signature and 30-minute sliding window-vs.-overall session may be the same or may be different (to account for the likely differences in the session profile and the signature profile).

Figure 33:
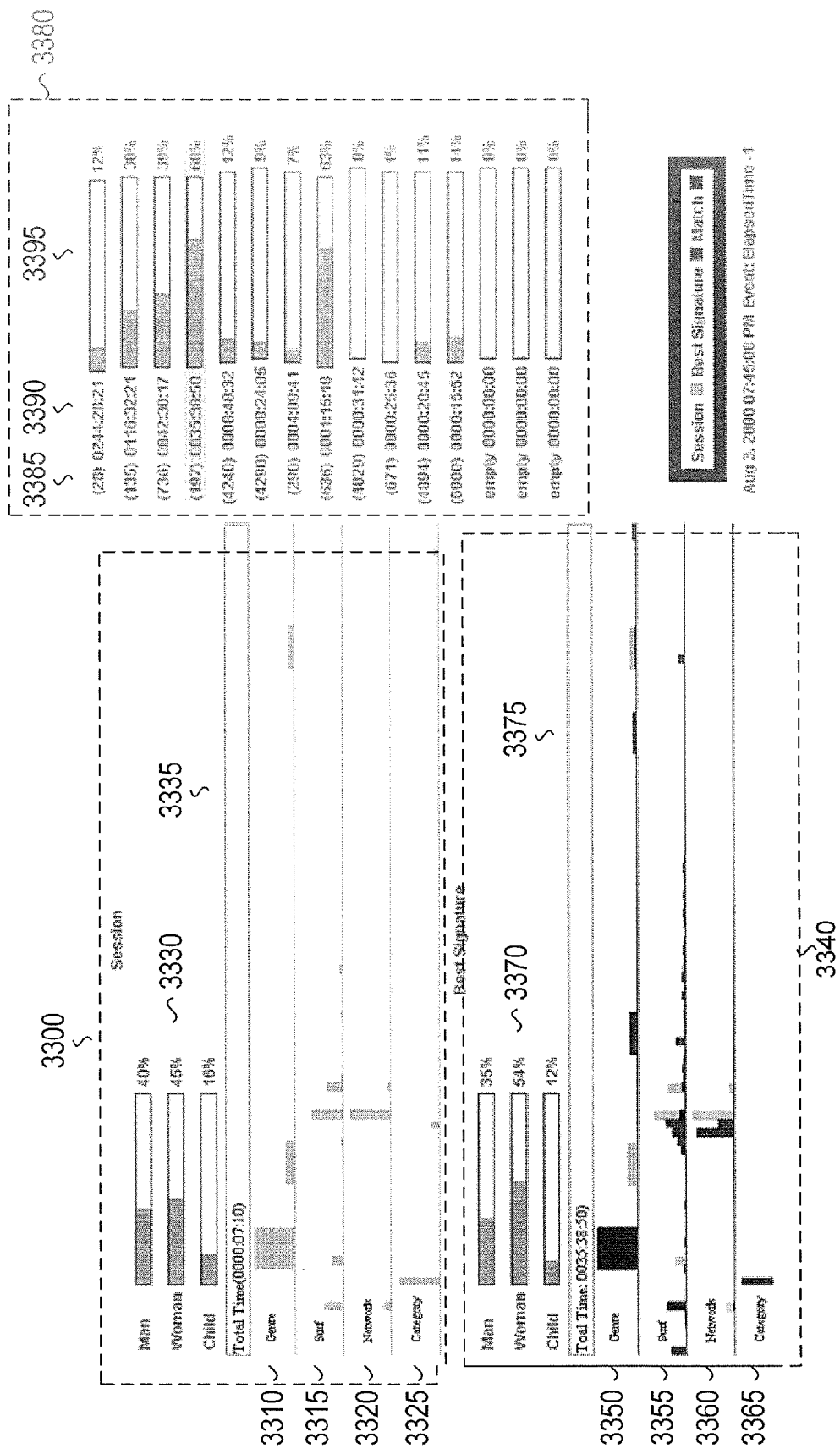
FIG. 33 illustrates how session data are correlated and matched to signature data, according to one embodiment.

FIG. 33 illustrates an exemplary graphical user interface (GUI) comparing session data and signature data. The GUI includes a session portion 3300, a best match portion 3340 and a signature summary portion 3380. The session summary portion 3300 includes graphs for genre 3310, surf dwell time 3315, network by day part 3320, category 3325, and viewer type 3330 for the session, and also includes total time 3335 associated with the session. The best match portion 3340 includes graphs for genre 3350, surf dwell time 3355, network by day part 3360, category 3365, and viewer type 3370 for the signature, and also includes total time 3375 associated with the signature. According to one embodiment, the session data for genre, surf, network and category is over laid on the signature data for the same. In a preferred embodiment, the GUI would use different colors, one color for session data, another color for the signature data, and a third color illustrating the overlap between the session data and the signature data.

The signature summary portion 3380, illustrates a number of signatures identified by their unique ID 3385, total time 3390 and correlation score 3395. The number of signatures displayed may be the top signatures (i.e., top 5), may be all of the signatures stored therein, or may be a predetermined number of signature slots. As illustrated, there are 15 signature slots displayed with the last three being empty signature slots. While it would be possible to store a large amount of signatures on the STB, there is a practical limit to how many should be stored thereon. The limit would be based on the memory in the STB as well as the granularity that is desired in the different signatures. As previously discussed, session monitoring and signature matching preferably occur in real time (or near-real-time), as session data is being received, processed, and continuously compared with signature data. Thus, the correlation scores are updated in real time (or near real time).

The correlation scores 3395 may be based on the correlation of a single element, multiple elements, or multiple weighted elements. According to one embodiment, the correlation score is based on the program genre, surf dwell time and networks. These elements may be weighted with program genre having the heaviest weighting factor. While the viewer type is not used in the correlation score in this embodiment, it may be used to exclude potential matches between a session and a signature. That is, if the session viewer type is significantly different from the signature viewer type, the match will be rejected. If the match is right on the threshold for acceptance, or no match can be found, the VCPS 290 examines the category data to assist in the session to signature match determination. For instance, if the session has a large amount of viewing time in a small set of categories, then the VCPS 290 can search the signature data for high viewing time in those categories.

Figure 34:
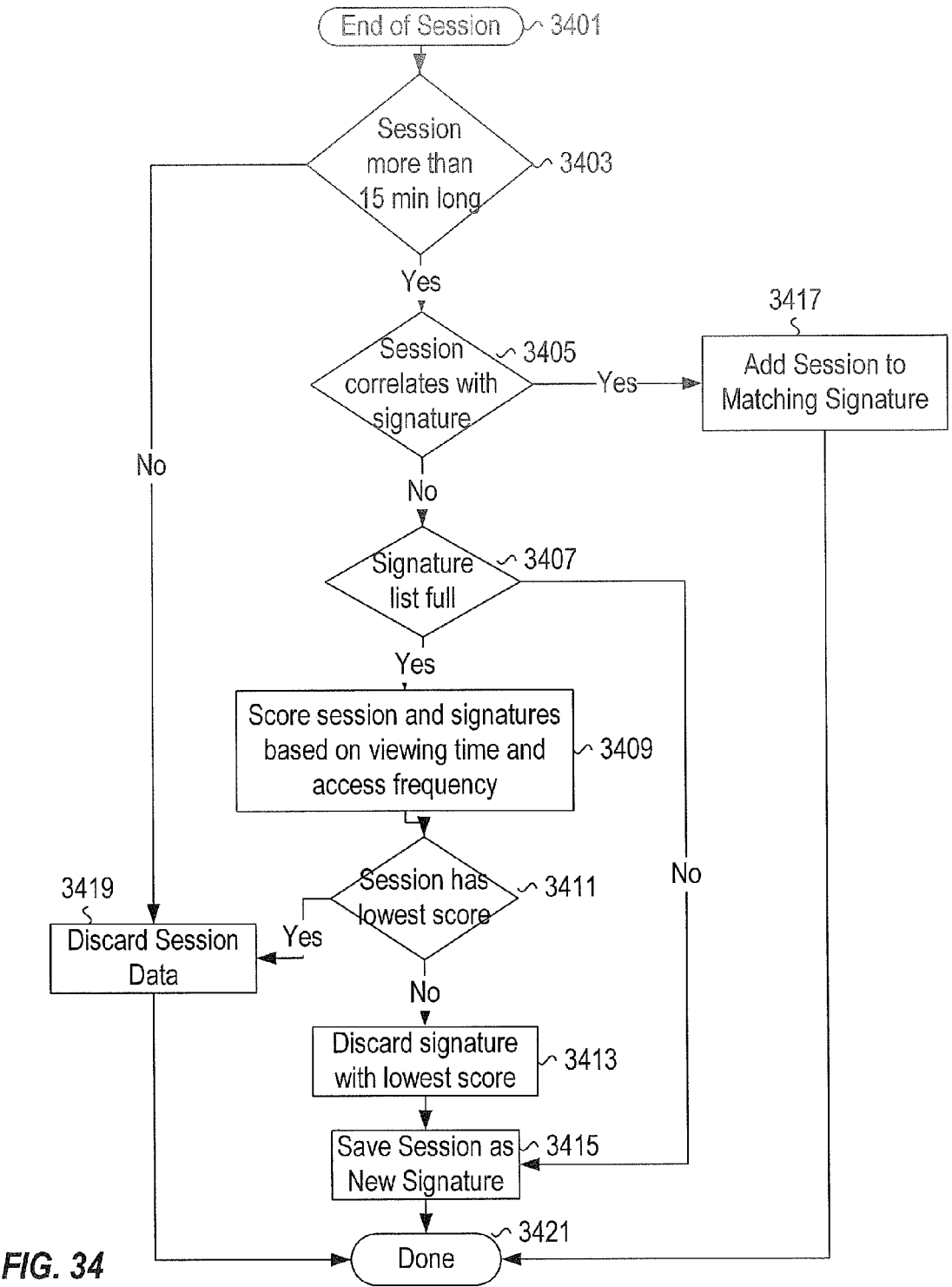
FIG. 34 illustrates an exemplary process flow of how session data is saved and matched to a signature, according to one embodiment.

FIG. 34 illustrates an exemplary process flow of how, at the end of a session, session data is saved and matched to a signature. A session ends at step 3401, and then a determination is made as to whether or not the length (i.e., duration) of the session was at least a certain amount of time (i.e., 15 minutes) at step 3403. If not, then the session data is discarded at step 3419 as such a short session is not considered to be of much value. If the session duration is greater than 15 minutes, then a determination is made as to whether or not the session data correlates (i.e., meets a correlation threshold) with a signature at step 3405. If the session data does correlate with a signature then the session data is added to the matching signature at step 3417. If the session data does not correlate with a signature, then a determination is made as to whether the signature list is full at step 3407. If the signature list is not full (i.e., the number of stored signature has not exceeded a preset maximum) then the session data is saved as a new signature at step 3415. If however the signature list is full, then the session and existing signatures are "scored" based on viewing time and access frequency at step 3409 (e.g., a session or signature with larger viewing time and/or click frequency contains more data with which to profile and thus receives a higher score). A determination is made as to whether the session score is the lowest at step 3411. If the session "scores" the lowest, then the session data is discarded at step 3419. Otherwise, the signature with the lowest score is discarded at step 3413 and the session data is saved as a new signature at step 3415.

It is to be noted that the session duration parameter (step 3403) used to determine whether or not the session data should be discarded is not required to be 15 minutes, but could a much smaller or much larger unit of time, or could be an adaptable parameter without departing from the scope of the current invention. Also, the minimum correlation threshold used to determine whether a session and a signature correlate (step 3405), could be set to a relatively high or low value, or could be based on one or more parameters as discussed above without departing from the scope of the current invention. These parameters could be adaptable and set depending on implementation preference. Moreover, as one skilled in the art would recognize there are numerous methods for scoring the signatures (step 3409) that would be well within the scope of the current invention.

According to one embodiment, the VCPS 290 may consider the signatures with the most viewing time to be off limits to purging. If a signature has a large amount of viewing time but the viewer that created it is no longer with the household, the signature will eventually be able to be deleted after the system accumulates viewing time for the active signatures. For the signatures that can be deleted, a combination of total viewing time and date that the signature was last updated contribute to the signature that the system selects for purging. A STB box has N slots for signatures and only signatures in the top N/2 slots can be considered off limits for purging. The system then calculates the total viewing time T for all signatures. If a signature is in a top slot and it has a viewing time of at least T/2N, then the signature cannot be deleted.

For example, assume that the STB has 15 signatures (N=15) stored therein and has compiled 50,000 seconds of total viewing time for all signatures (T=50,000). A signature cannot be purged if it is within the top 7 signatures (15/2) of viewing time and the signature viewing time is at least 1,667 seconds (50000/30).

The signatures that can be deleted will be assigned a score based on the viewing time and date of last update. Given a viewing time of V and number of days since last update of D, then the score will be V/((D/10)+1). Thus basically states that every 10 days of signature inactivity reduces the value of the viewing time. For example, if the viewing time is 2000 seconds and it has been 12 days since the last update, the score will be 1000 [2000/((12/10)+1)]. Note that the calculation uses integer math, which rounds the result down. Thus, the denominator includes a +1 to ensure that the value will not be 0.

The following example demonstrates all of these concepts. This example has six signature bins and a total viewing time of 60,000 seconds. Thus, the top three signatures that have a minimum signature time of 5000 seconds (60000/12) may be marked as off limits. However, as illustrated only two of the bins meet the viewing time and are marked off limits. Out of the remaining four signatures, signature 5 has the lowest score of 2000 [4000/(16/10)+1)].

| Slot | Time (s) | Days Since Update | Score | Description |
|---|---|---|---|---|
| 1 | 30000 | 20 | n/a | off limits |
| 2 | 15000 | 0 | n/a | off limits |
| 3 | 4500 | 11 | 2250 | |
| 4 | 4000 | 8 | 4000 | |
| 5 | 4000 | 16 | 2000 | deleted |
| 6 | 2500 | 2 | 2500 | |

Figure 35A:
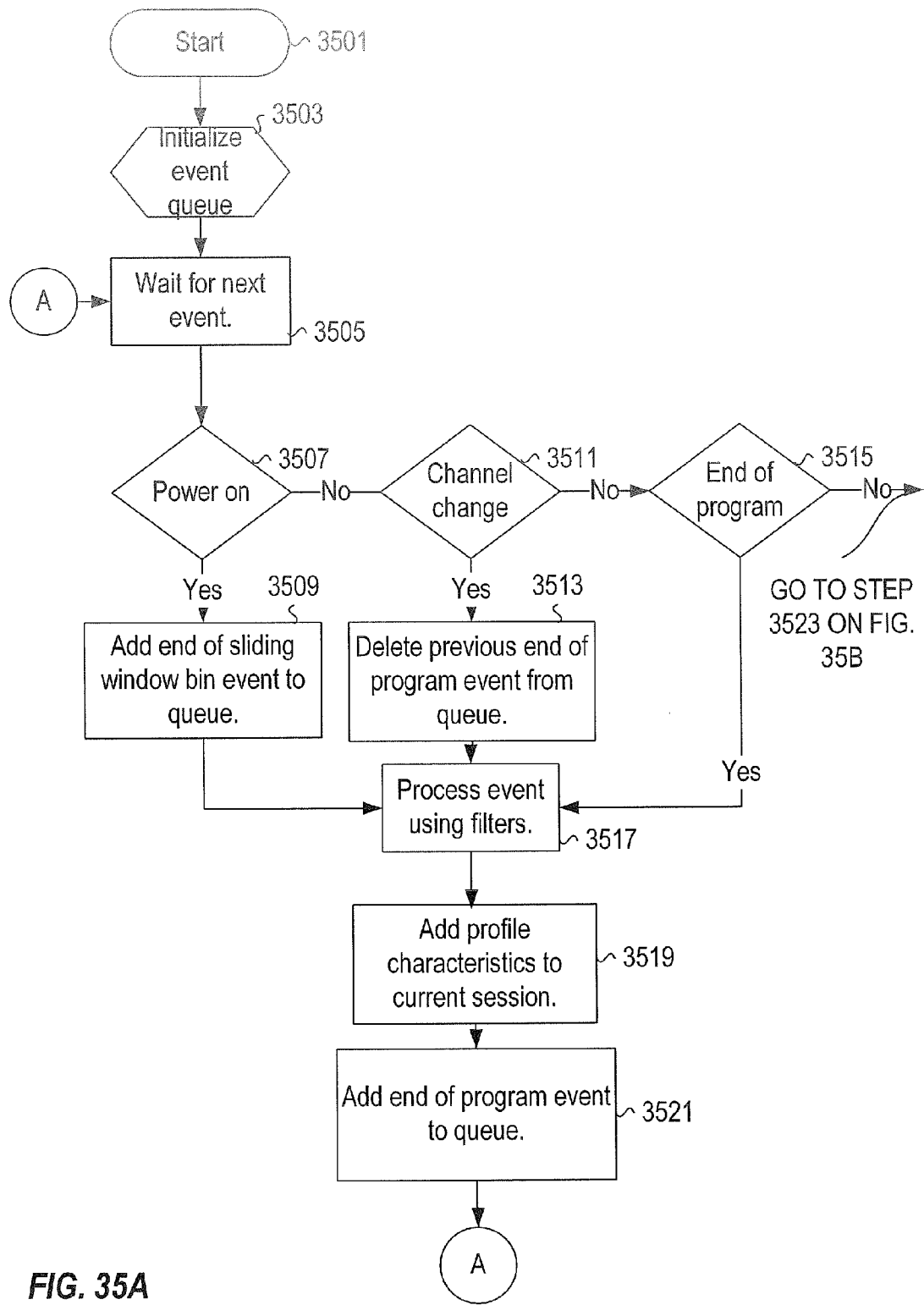
FIGS. 35A-B illustrate an exemplary process flow generating the session profile and adding the session profile to a correlated signature profile based on the event queue, according to one embodiment.
Figure 35B:
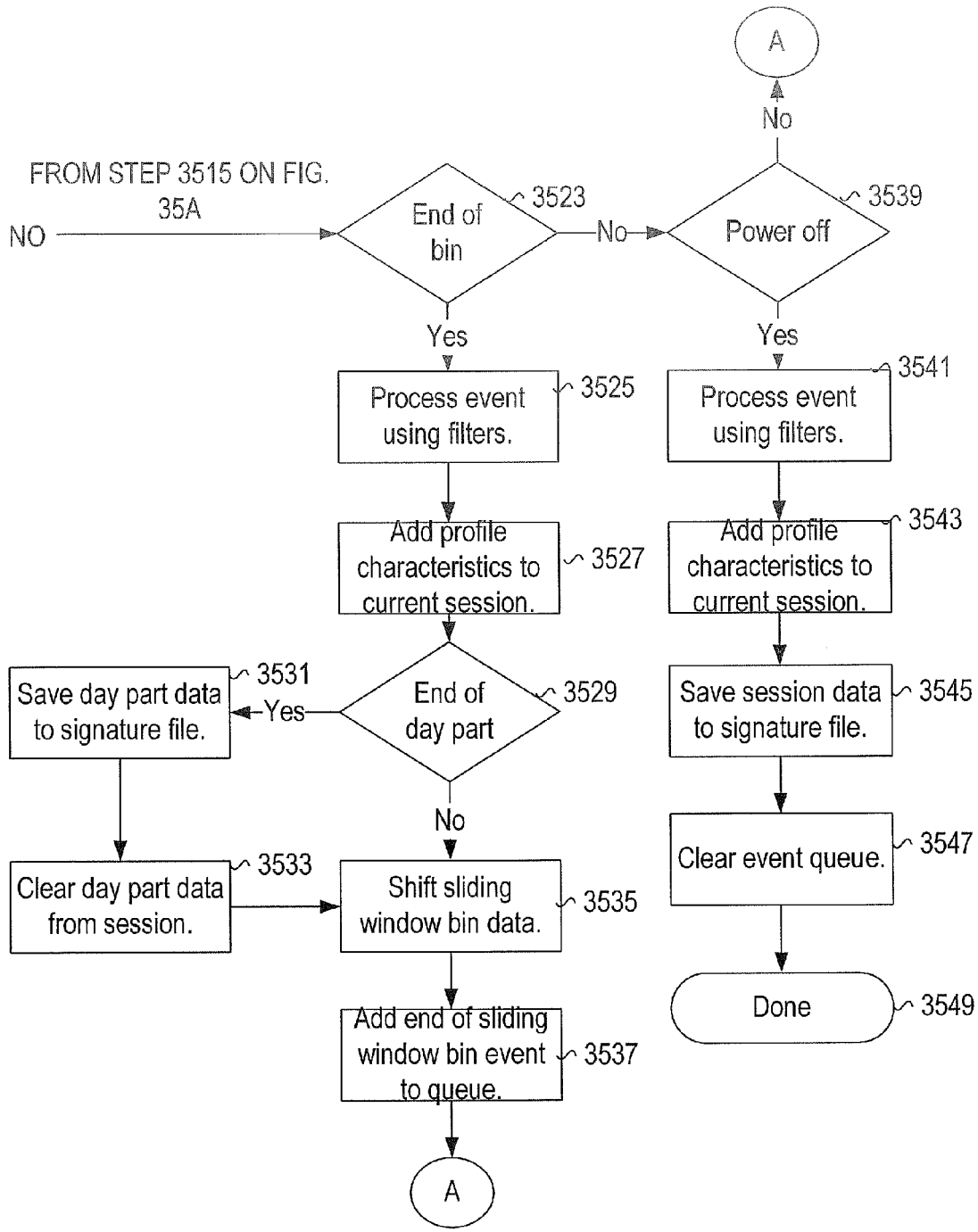

FIGS. 35A-B illustrate an exemplary method for updating the signature profile with the session profile based on activity (events captured in the event queue). After the process starts (step 3501), the event queue is initialized (step 3503), and the VCPS 290 waits for the next event (step 3505). Once the next event is received, the VCPS 290 determines if the event is a power on event (step 3507). If the event was a power on event, the VCPS 290 determines when the sliding window will end (i.e., 15 minute window and 30 minute window) and adds these times as upcoming events in the event queue (step 3509). The power on event is then processed (step 3517). If the event was determined to not be a power on event, a determination of whether the event was a channel change event is made (step 3511). If the determination is that the event was a channel change, the VCPS 290 deletes the end of program event associated with the previous channel from the event queue (step 3513) and processes the channel change (step 3517). If the event was not a channel change, the VCPS 290 determines if the event was an end of program event (step

3515). The end of program determination is made by comparing the current time to the time marked in the event queue for the end of the current program. If the event was an end of program, then the end of program event is processed by the VCPS (step 3517).

After the event (power on, channel change, end of program) is processed at step 3517, the profile characteristics associated with the event are added to the current session profile (step 3519). In accordance with a preferred embodiment of the current invention, the characteristics of the event are added on a time-weighted basis. Based on the current channel that is tuned to, the VCPS 290 determines when the current program is scheduled to end (based on program data) and adds an event for the end of the program to the event queue (step 3521).

If the event was determined not to be an end of program event, the VCPS determines if the event was an end of bin event as established in step 3509 (step 3523). If the event was an end of bin event, the end of bin event is processed (step 3525) and the characteristics of this event are added to the current session profile (step 3527). Next a determination is made as to whether it is the end of a day part (step 3531). If it is determined that it was the end of a day part, the current session profile for that day part (i.e., bin 3040) is saved to the associated signature profile (step 3531) and then cleared (step 3533). Regardless of whether, the event was an end of day part or not, the data within the sliding windows is shifted to the next bin (step 3535). Referring back to FIG. 30, the contents of bin 3002 is shifted to bin 3004, 3004 to 3006, . . . and 3012 into 3040 and 3050. Now that the sliding window has been shifted, the VCPS determines the end of the sliding window and adds that data to the event queue (step 3537). The process then returns to step 3505 (waiting for next event).

If the event was not an end of pin event, the VCPS 290 determines if the event was a power off event (step 3539). If the event was not a power off event, the process returns to step 3505. If the event was a power off event, the power off event is processed (step 3541), the characteristics of this event are added to the current session profile (step 3543), the session profile is added to the associated signature profile, preferably on a time weighted basis (step 3545), and the event queue is cleared (step 3547). The process is complete at step 3549.

As one of ordinary skill in the art would recognize, this process is merely an exemplary process. The steps of the process could be rearranged, steps could be removed or added, or completely different steps could be used to accomplish the same or similar result without departing from the scope of the current invention.

According to one embodiment, the VCPS 290 also periodically compares each signature with every other signature, in order to identify signatures that may correlate with one another. For example, as session data is added to existing signatures, it is possible that some of the signatures will begin to correlate with one another, indicating that the signatures actually represent the same viewer or viewer type. In one embodiment, the VCPS 290 handles this case by attempting to correlate signatures after every signature update. These updates preferably occur at the end of day parts and the end of sessions. The process of merging or joining two correlated signatures is accomplished by comparing the recently updated signature with every other signature stored by the VCPS 290. The signature that best matches (according to a predefined threshold) will be merged with the recently updated signature by calculating the weighted average of the signature data. Additionally, the VCPS 290 preferably performs the process iteratively, attempting to merge the new signature with all other signatures. This iterative procedure is carried out because combining the two signatures may have altered them enough to correlate with another signature.

According to one embodiment, the VCPS 290 compares most of the elements of the signature data in order to determine if signatures correlate with one another. Unlike the session to signature comparisons, category data is used in the signature correlation process because the signatures represent many sessions, and the correlation of category data is particularly useful when comparing large data sets. However, viewer type is not used to correlate signatures, it is only used to exclude matches. That is, if the VCPS 290 determines that two signatures correlate, the VCPS 290 will look at viewer type. As long as the viewer type is not significantly different, the VCPS 290 will merge the two correlated signatures. However, if the viewer type is significantly different (i.e., signature 1=0.8 male, 0.1 female, 0.1 child and signature 2=−0.1 male, 0.8 female, 0.1 child) then the VCPS 290 will not merge the two signatures.

The VCPS 290 can perform the comparisons either after updating a signature with session data or as a background task. Performing the comparisons after an update will require only comparing the updated signature with the other signatures. Background comparisons must compare all signatures against all others. If two or more signatures correlate beyond a certain correlation threshold, the VCPS 290 combines signatures by performing a weighted average of the data from each signature. Such a correlation threshold may be dynamically configurable (e.g., from instructions from the HE).

In an alternate embodiment, standardized or customized signatures are downloaded from the HE 210 and stored at the STB 220 for utilization by the VCPS 290. Such custom signatures may be derived based on, for instance, expected or predicted viewer behavior, or alternatively, these signatures may represent aggregate session data from multiple households. An example of such a signature is one that reflects one or more demographic traits shared by a cluster or group of households, which may be identified by analyzing session profile data (or signatures) from an array of households, and grouping households together that have highly correlative session or signature profiles. Session profiles can then be correlated with these "standard" signatures (e.g., a form of collaborative filtering) as well as with locally generated signatures as described above.

As discussed above, the VCPS 290 correlates profiles with other profiles, including, but not limited to:
- session profile v. itself—to determine when one session is terminated and another is began;
- session profile v. numerous signature profiles—to determine which, if any, signature profile the session profile should be added to;
- a session profile v. matching signature profile—to determine when a session is terminated and another is began; and
- updated signature profile v. other signature profiles—to determine if updated signature profile now correlates with the other signature profiles.

There are numerous ways that profiles can be correlated with each other. The correlation can range from simple to complex. The complexity of the correlation depends on such factors as what is being correlated, and how much data is contained within the profiles. For example, a correlation of a session profile against itself may be quite simple. That is, a single profile (i.e., network profile) may be monitored to determine when a session ends. On the other hand, a correlation of a session profile to a signature profile may be more complex and may correlate numerous profiles (i.e., genre, networks, category, surf) to determine when there is a match. Some possible profile correlations and the value of each are discussed below.

Genre profiles indicate the amount of time that a viewer watches each type of program genre, in effect weighting the importance of that program type to the viewer. The sessions and signatures track the viewing times of each genre in an array. The correlation compares the elements of each of the genre arrays. As it is believed that viewers generally watch the same types of programs, using the genre in the correlation calculation provides a highly accurate method for quickly comparing two profiles.

Channel surf dwell time profiles capture how long a particular channel or network will maintain the viewers' interest during a surf routine. Because a channel surf sequence may only take one or two minutes, a major benefit of tracking channel surf behavior is that the dwell time data is collected over a short period of time when compared with viewing interests. The sessions and signatures track dwell times by network, and each one has an array of both the number of times a network is visited during the surf sequence and the total dwell time on each network, in order to calculate an average dwell time per network per channel surf sequence. The average dwell time per network is correlated.

Network profiles track the amount of time that the viewer watches a particular network by day part and day of week. Because a viewer will typically watch the same programs at the same time every week, correlating the data by the appropriate day and day of week results in matching a viewer session to the appropriate signature. In one embodiment, the session-to-signature correlation compares the network information for the current day and day part against the signature data for the same time. The signature-to-signature correlation used to merge signatures compares all network day and day part data. The average correlation is used to help determine whether the signatures match. Since the signatures aggregate data over many sessions, the network viewing by day part should be similar if the signatures actually represent the same viewer.

Program category profiles are much more specific than genres and can be utilized, for instance, if a session cannot be matched with a signature or only produces marginal matches, to match a session with a signature. For example, if the VCPS 290 collects data reflecting a large amount of viewing time in a small set of categories, the VCPS 290 can search the history for signatures with large viewing times in those same categories. The search results can be used to determine if a marginal match between session and signature is actually a match. It can also help classify a session that would not otherwise correlate with a signature.

As would be obvious to one of ordinary skill in the art, the amount of data gathered for each session and each signature is dependent upon the amount of memory in the STB 220, the amount of granularity (and potentially accuracy) desired. A tradeoff needs to be made between the amount of memory required and the granularity/accuracy desired. According to one embodiment, each session profile includes the following category profiles:

genre for overall session;
network viewership for current day part;
channel surf sequence for overall session;
category data for overall session; and
viewer type for overall session.

According to one embodiment, each signature profile includes the following category profiles:

genre for overall history;
network viewership for prime time for each weekday (Mon-Fri);
network viewership for evenings for all weekdays;
network viewership for late night for all weekdays;
network viewership for daytime for all weekdays;
network viewership for weekends;
channel surf sequence for overall history;
category data for overall history; and
viewer type for overall history.

The VCPS 290 may track prime time viewership (8 PM-11 PM) for the weekdays, evening viewing (6 PM-8 PM) for all weekdays, late night viewing (11 PM-5 AM) for all weekdays, daytime viewing (5 AM-6 PM) for all weekdays and weekend viewership. According to this embodiment, when comparing session data to signature data, the VCPS 290 compares the following data as the primary match criteria: session genre data and signature genre data; session network data by day part with signature network data by same corresponding day part; and session surf dwell time with signature surf dwell time. Each element or category may be weighted based on the importance of the data in the correlation. Genre has the largest weighting factor in this embodiment, but other relative weightings are also possible. The correlation result is a score for the signature match. The signature that has the highest correlation with the session is considered the best match, and the session data may be associated with that signature.

The signature profiles may be used to target content (advertisements, pay per view (PPV) events, video on demand (VOD) programming) to the subscribers or to customize their viewing environment (i.e., favorite programs listed first in EPG, format of EPG). The signature profiles stored in the STB 220 may be transmitted to the HE at determined intervals (i.e., every night at off-peak hours, every week). The HE may aggregate the data received from each of the STBs 220 connected thereto in order to form groups of viewers with similar characteristics. The groups having similar characteristics may receive specific content targeted to their characteristics (signature profiles). According to another embodiment, the HE may also use other external data to help group subscribers. The external data may be in the form of geodemographic data, such as the demographic data associated with distinct ZIP+4 geographies provided by Claritas Ser. Nos. 60/238,059, 09/635,542 and Ser. No. 09/928,024 which were previously referred to and incorporated by reference for additional details). The external data may also be in the form of other transactional profiles, such as purchase transactions Ser. Nos. 09/951,577, 09/268,519 and Ser. No. 09/928,024 which were previously referred to and incorporated by reference for additional details).

The groups may be formed based on the topography of the television viewing network (i.e., based on nodes within the system). The groups would then consist of clusters of subscribers, wherein each of the clusters could be associated with a node, branch or other element of the system (see Ser. Nos. 60/278,612 and 09/928,024 which were previously referred to and incorporated by reference for additional details). In an alternative embodiment, the STB may receive the additional data (i.e., geodemographic data, other transaction data) directly and incorporate this data into the generated profiles (i.e., signature profiles) to develop enhanced profiles. These enhanced profiles can then be forwarded to the HE for aggregation and potential grouping as described above.

Regardless of where the enhanced profiles are generated, there is likely a practical limit to how many different groups are formed (i.e., 5). The groups may be formed and the advertisements targeted thereto, or ad profiles defining characteristics about the target market of the ad are created and the users are grouped to these profiles. As discussed above, each of the groups may receive material targeted for them. In one embodiment, everybody will receive all content and will select the appropriate content for display based on matching the group number associated with the content and the group number of the STB, or particular user or group of users interacting with the STB. In a preferred embodiment, each STB will receive only the content associated with it based on what group it falls in, thus saving bandwidth. If the content is targeted ads, the targeted ads may be inserted in place of the default ads to create a plurality of presentation streams (programs with targeted ads). Local cable companies have the equipment necessary to insert targeted ads as they are permitted to substitute local ads in place approximately 20% of the default ads. In the preferred embodiment, it is necessary for the television system to be able to route the different presentation streams to different areas (i.e., nodes, branches) within the system so that each user only receives the appropriate presentation stream (see Ser. No. 09/553,637, PCT/US00/10633, Ser. No.s 09/553,099, 09,694,848, PCT/ US00/29034 and Ser. No. 09/712,790 which were previously referred to and incorporated by reference for additional details).

In an alternative embodiment, the STB will insert specific content (i.e., targeted ads) locally. Thus, each subscriber may, in effect, have ads targeted directly to them. The ads may be inserted in avails (advertisement opportunities) regardless of the programming being viewed. The STB may receive the targeted ads via an ad channel. The ads may be delivered ahead of time and stored on the STB, or be received at approximately the same time as the avail and inserted on the fly. If the ads are to be stored on the STB, the ad channel may deliver a plurality of ads on the ad channel with the STB selecting the appropriate ads to store thereon. The selection may be made based on group designations or may be made by comparing the ad profile with the signature profiles on the STB. In addition to the ads, an ad queue will need to be generated and stored on the STB to define what order the ads are inserted and what criteria affect the criteria (see Ser. No. 09/712,790, PCT/US01/27217, Ser. Nos. 09/731,606, 09/748,943, 09/750,800 and Ser. No. 09/824,434 which were previously referred to and incorporated by reference for additional details).

In an alternative embodiment, the ad queue may be stored on the STB while the ads are stored somewhere else within the network. When the ad queue determines the next ad to be inserted, the ad is retrieved from the network and delivered to the STB. The ad may be delivered over an ad channel or over a dedicated line (such as an Internet connection). If the ad channel was used the ads may be delivered in real time (would require coordination between program(s) and ad channel), or ahead of time and temporarily stored (i.e., start delivering one avail in advance). The ads could be delivered on the ad channel either at the actual bit rate for the ad or at a slower bit rate where portions of the ad are stored as they are received. As one skilled in the art would recognize, the Internet connection provides both benefits and drawbacks. The drawback is the need the separate connection. The benefit is that the queue points to the URL address for the ad so the ad is displayed upon selection from the queue (see Ser. No. 09/742,506 which was previously referred to and incorporated by reference for additional detail).

In a preferred embodiment, the ad queue is actually a plurality of ad queues with a different queue associated with each signature, or group of signatures. When the VCPS 290 determines that a session has ended and thus a new user or group of users (identified by a correlation with a new signature) is interacting with the TV, the ad queue changes to the one associated with that signature. Moreover, the ad queue may be adjusted based on the programs being watched as certain advertisers may not want ads displayed during certain programs or may pay a premium for insertion in other programs (See Ser. No. 09/742,852 which was previously referred to and incorporated by reference for additional detail).

According to another embodiment, the STB may also store ads and ad queues for other types of targeted advertisements such as EPGs, program bugs (overlay in the corner of the video), product placement (illustration of product placed in program, such as a Coke can placed in actors hand), trick play ads (shortened version of ad displayed when user fast forwards through recorded ad), and record ads (alternative ads placed in a recorded program if it is determined that different subscriber is viewing or if it is being viewed for more than the first time). The ad queue could be used to manage how all of these ads are displayed so as not to saturate the viewer but yet enhance the advertisement effectiveness. The various types of ads and possible coordination therebetween are discussed in Ser. Nos. 60,238,056, 09/749,255, PCT/US01/31682, Ser. Nos. 09/680,622, 60/281,037 and Ser. No. 60/329,992 which have all previously been referred to and incorporated by reference for additional detail.

Regardless of what is being correlated (ad profile to signature profile, session profile to signature profile), how many different elements are being correlated (program genre; program genre, channel changes and networks), and whether the different elements are weighted or not, there are numerous ways to perform these correlations. If the profiles are in the form of vectors you can perform a scalar dot product on the vectors to determine the correlation between the two vectors. In order for a scalar dot product to work the vectors must be normalized. That is, the magnitude of the vector must be 1.0. To calculate the magnitude, take the square root of the sum of the squares of the components as shown below.

$$|V| = \sqrt{\sum_{i=1}^{N} V_i^2}$$

To normalize the vector, divide each component by the magnitude of the vector. Sample dot products are shown below.

$$\begin{bmatrix} 0.25 \\ 0.25 \\ 0.25 \\ 0.25 \end{bmatrix} \cdot \begin{bmatrix} 0.25 \\ 0.25 \\ 0.25 \\ 0.25 \end{bmatrix} = 1.00$$

$$\begin{bmatrix} 0.25 \\ 0.25 \\ 0.25 \\ 0.25 \end{bmatrix} \cdot \begin{bmatrix} 1.0 \\ 0.0 \\ 0.0 \\ 0.0 \end{bmatrix} = 0.50$$

$$\begin{bmatrix} 0.25 \\ 0.25 \\ 0.25 \\ 0.25 \end{bmatrix} \cdot \begin{bmatrix} 0.4 \\ 0.1 \\ 0.2 \\ 0.3 \end{bmatrix} = 0.46$$

One problem with the simple scalar dot product is that, it is possible to have vectors that do not match each other have the same scalar dot product as vectors that are identical (first illustrated vector above).

According to another embodiment, the variance ($\sigma^2$) and standard deviation ($\sigma$) of vectors may be used to calculate the correlation. Assuming the two vectors that we wish to correlate are labeled A and B, the variance is defined by the following function:

$$\sigma^2 = \frac{1}{N} \sum_{i=1}^{N} (A_i - B_i)^2$$

The equation produces a low variance if there are only small differences between the components of each vector. This indicates a high correlation. A variance of zero indicates that there is no difference between the two vectors. Since each distribution vector is normalized, the square of the difference of each component will be in the range of 0 through 1. Since the variance is the average of this value, the variance will be limited to the same range. The actual variances will be small since the differences between components of a distribution will be small, and the differences are squared.

The standard deviation, $\sigma$, is the square root of the variance. Since the variance will be very small, the square root will increase the value. Therefore, it is suggested that the standard deviation be used as the basis of the correlation value. As a correlation of 1.0 would reflect a perfect match a standard deviation of 0.0 is a perfect match. Since the standard deviation will be constrained to values between 0 and 1, the following equation is suggested for the correlation:

correlation=1−$\sigma$

Using the above examples, the correlations are now calculated as:

$$\begin{bmatrix}0.25\\0.25\\0.25\\0.25\end{bmatrix}\begin{bmatrix}0.25\\0.25\\0.25\\0.25\end{bmatrix} = 1.00$$

$$\begin{bmatrix}0.25\\0.25\\0.25\\0.25\end{bmatrix}\begin{bmatrix}1.0\\0.0\\0.0\\0.0\end{bmatrix} = 0.56$$

$$\begin{bmatrix}0.25\\0.25\\0.25\\0.25\end{bmatrix}\begin{bmatrix}0.4\\0.1\\0.2\\0.3\end{bmatrix} = 0.88$$

The above examples of correlation methods are exemplary in nature and in no way are intended to limit the scope of the invention. As would be obvious to one or ordinary skill in the art, there are numerous other methods for determining the correlation between profiles that would be well within the scope of the current invention.

As will be evident to those of ordinary skill in the art, the VCPS 290 application and other software components, can be implemented in a variety of software languages, including C, C++, and Java. Moreover, the VCPS can be implemented on and/or integrated with a variety of STB platforms, including those boxes produced by Motorola (formerly General Instrument) and Scientific Atlanta, and with a variety of operating systems, including VxWorks and PowerTV, and with a variety of middlewares such as those produced by Liberate and OpenTV.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method of differentiating viewers interacting with a content presentation device, the method comprising:
   (a) monitoring a first plurality of inputs from at least one first viewer to the content presentation device during a first session, wherein the first plurality of inputs form at least one first session profile;
   (b) merging, based on a correlation threshold, the at least one first session profile into at least one signature profile, wherein the at least one signature profile is formed independently of viewer characteristics stored in the content presentation device prior to the monitoring of (a);
   (c) monitoring a second plurality of inputs from a second viewer to the content presentation device during a second session, wherein the second plurality of inputs form at least one second session profile;
   (d) comparing the at least one second session profile to the at least one signature profile; and
   (e) identifying a matching signature profile corresponding to the at least one second session profile if the at least one signature profile is sufficiently correlated to the second session profile, wherein the matching signature profile is selected from the at least one signature profile.

2. The method of claim 1, wherein the matching signature profile is identified without knowing the actual identity of the second viewer.

3. The method of claim 1, further comprising:
   (f) delivering content to the content presentation device, wherein the content is targeted to the matching signature profile identified in (e).

4. The method of claim 3, wherein the content is targeted based on determining a demographic profile of the matching signature profile.

5. The method of claim 3, wherein the content is targeted based on determining preference probabilities from the matching signature profile.

6. The method of claim 1, wherein the at least one first session profile and the at least one signature profile identify viewing habits of the at least one first viewer including at least some subset of program genre viewing habits, program category viewing habits, network viewing habits, and dwell time habits.

7. The method of claim 1, wherein the at least one first session profile and the at least one signature profile identify probable demographic traits of the at least one first viewer.

8. The method of claim 7, wherein the demographic traits distinguish the at least one second session profile from the at least one signature profile.

9. The method of claim 7, wherein the demographic traits are generated by applying heuristic rules to the at least one first session profile and the at least one signature profile.

10. The method of claim 9, wherein the heuristic rules are applied to program genre and program categories viewed.

11. The method of claim 9, wherein the heuristic rules are applied based on time that the first and second plurality of inputs are received.

12. The method of claim 1, wherein the at least one signature profile includes a time weighted average of the at least one first session profile generated based on previous interactions with the content presentation device.

13. The method of claim 1, further comprising:
determining, based on the matching signature profile that the second viewer is different than the at least one first viewer.

14. The method of claim 1, further comprising:
determining, based on the matching signature profile that the second viewer is the same as the at least one first viewer.

15. A method of differentiating viewers using a content presentation device, the method comprising:
monitoring a first plurality of inputs from at least one first viewer to the content presentation device during a first session, wherein the first plurality of inputs form at least one first session profile;
merging, based on a correlation threshold, the at least one first session profile into at least one signature profile, wherein the at least one signature profile is formed independently of viewer characteristics stored in the content presentation device prior to the monitoring of the first plurality of inputs;
monitoring a second plurality of inputs from a second viewer to the content presentation device during a second session, wherein the second plurality of inputs form at least one second session profile;
determining at least one signature channel search sequence corresponding to the at least one signature profile;
retrieving a session channel search sequence corresponding to the at least one second session profile; and
identifying a matching signature profile corresponding to the at least one second session profile based on a comparison of the session channel search sequence to the at least one signature channel search sequence for each of the least one signature profiles.

16. The method of claim 15, further comprising:
determining based on the identifying a matching signature profile that the second viewer is likely a viewer corresponding to the matching signature profile, without knowing the actual identity of the viewer, and therefore has characteristics determinable by analysis of the matching signature profile.

17. The method of claim 15, further comprising:
retrieving a signature channel dwell time for the identified matching signature profile; and
determining, based on the signature channel dwell time, a list of channels in the session channel search sequence to be included in determining the characteristics of the matching signature profile.

18. The method of claim 17, further comprising:
determining to which program each channel in the session channel search sequence corresponds, based on the determined list of channels.

* * * * *